United States Patent
Yoshino et al.

(10) Patent No.: US 12,519,623 B2
(45) Date of Patent: Jan. 6, 2026

(54) RECEPTION DEVICE, QUANTUM KEY DISTRIBUTION SYSTEM, AND METHOD FOR DETECTING QUANTUM SIGNAL

(71) Applicants: NEC CORPORATION, Tokyo (JP); NATIONAL INSTITUTE OF INFORMATION AND COMMUNICATIONS TECHNOLOGY, Tokyo (JP); NATIONAL UNIVERSITY CORPORATION HOKKAIDO UNIVERSITY, Sapporo (JP); THE UNIVERSITY OF TOKYO, Tokyo (JP)

(72) Inventors: Ken-ichiro Yoshino, Tokyo (JP); Mikio Fujiwara, Tokyo (JP); Akihisa Tomita, Hokkaido (JP); Masato Koashi, Tokyo (JP); Masahiro Takeoka, Tokyo (JP); Masahide Sasaki, Tokyo (JP)

(73) Assignees: NEC CORPORATION, Tokyo (JP); NATIONAL INSTITUTE OF INFORMATION AND COMMUNICATIONS TECHNOLOGY, Koganei (JP); NATIONAL UNIVERSITY CORPORATION HOKKAIDO UNIVERSITY, Sapporo (JP); THE UNIVERSITY OF TOKYO, Tokyo (JP)

( * ) Notice: Subject to any disclaimer, the term of this patent is extended or adjusted under 35 U.S.C. 154(b) by 186 days.

(21) Appl. No.: 18/274,871

(22) PCT Filed: Jan. 24, 2022

(86) PCT No.: PCT/JP2022/002431
§ 371 (c)(1),
(2) Date: Jul. 28, 2023

(87) PCT Pub. No.: WO2022/163575
PCT Pub. Date: Aug. 4, 2022

(65) Prior Publication Data
US 2024/0089093 A1 Mar. 14, 2024

(30) Foreign Application Priority Data
Jan. 29, 2021 (JP) .................. 2021-013984

(51) Int. Cl.
*H04L 9/08* (2006.01)
*G06N 10/40* (2022.01)

(52) U.S. Cl.
CPC .......... *H04L 9/0852* (2013.01); *G06N 10/40* (2022.01)

(58) Field of Classification Search
CPC ....... H04L 9/0852; H04L 9/0861; H04L 9/12; H04L 9/0858; H04B 10/70; G06N 10/40
See application file for complete search history.

(56) References Cited

U.S. PATENT DOCUMENTS 7,864,958 B2 * 1/2011 Harrison ............... H04L 9/0858
380/278
8,488,790 B2 * 7/2013 Wellbrock ........... H04L 9/0855
380/255

(Continued)

FOREIGN PATENT DOCUMENTS

CN 110784485 A 2/2020
CN 113328806 A 8/2021

(Continued)

OTHER PUBLICATIONS

Bing Qi, et al., "Time-Shift Attack In Practical Quantum Cryptosystems", 2007, pp. 073-082, vol. 7, No. 1.

(Continued)

*Primary Examiner* — Hosuk Song
(74) *Attorney, Agent, or Firm* — Sughrue Mion, PLLC

(57) ABSTRACT

An object is to prevent eavesdropping in quantum key distribution. A decoding unit decodes a quantum signal incident thereinto. A plurality of detect photons of the decoded quantum signal output from the decoding unit. A signal processing unit detects bits of the decoded quantum signal based on photon detection results of the plurality of detectors. A control unit perform switching processing by switching destinations to which two decoded quantum signals corresponding to one encoding basis are output between (Continued)

the plurality of detectors, and switching the bits detected by the signal processing unit based on the respective photon detection results of the plurality of detectors.

12 Claims, 21 Drawing Sheets

(56) References Cited

U.S. PATENT DOCUMENTS

| | | | | |
|---|---|---|---|---|
| 8,755,687 | B2* | 6/2014 | Dynes | H04B 10/70 |
| | | | | 398/40 |
| 9,178,623 | B2* | 11/2015 | Chen | H04B 10/5561 |
| 9,634,770 | B2* | 4/2017 | Dynes | H04B 10/70 |
| 11,290,192 | B2* | 3/2022 | Kaliteevskiy | H04B 10/25 |
| 11,438,148 | B2* | 9/2022 | Chen | H04L 9/0662 |
| 2017/0163415 | A1* | 6/2017 | Gray | H04L 9/0852 |

FOREIGN PATENT DOCUMENTS

| | | |
|---|---|---|
| JP | 2004-104771 A | 4/2004 |
| JP | 2007-20013 A | 1/2007 |
| JP | 2011-75577 A | 4/2011 |
| JP | 2013-539327 A | 10/2013 |
| JP | 2019-125961 A | 7/2019 |
| WO | 2014/132609 | 9/2014 |
| WO | 2019/106971 A1 | 6/2019 |

OTHER PUBLICATIONS

International Search Report for PCT/JP2022/002431 dated Apr. 12, 2022.
Written Opinion for PCT/JP2022/002431 dated Apr. 12, 2022.
Decision to Grant received in Japanese Application No. 2022-578362, mailed Aug. 6, 2024.

* cited by examiner

| | PHASE MODULATION [rad] | BIT |
|---|---|---|
| Z BASE | 0 | 0 |
| | $\pi$ | 1 |
| Y BASE | $\frac{\pi}{2}$ | 0 |
| | $\frac{3\pi}{2}$ | 1 |

Fig. 3

|  | POLARIZATION PLANE | BIT |
|---|---|---|
| STRAIGHT BASE | 0° | 0 |
|  | 90° | 1 |
| OBLIQUE BASE | 45° | 0 |
|  | 135° | 1 |

Fig. 15

|  | POLARIZATION TO BE DETECTED | |
|---|---|---|
|  | FIRST MODE | SECOND MODE |
| PD1 | 0° (H) | 90° (V) |
| PD2 | 90° (V) | 0° (H) |
| PD3 | 45° | 135° |
| PD4 | 135° | 45° |

Fig. 17

RECEPTION DEVICE, QUANTUM KEY DISTRIBUTION SYSTEM, AND METHOD FOR DETECTING QUANTUM SIGNAL

CROSS REFERENCE TO RELATED APPLICATIONS

This application is a National Stage of International Application No. PCT/JP2022/002431 filed Jan. 24, 2022, claiming priority based on Japanese Patent Application No. 2021-013984 filed Jan. 29, 2021.

TECHNICAL FIELD

The present invention relates to a reception device, a quantum key distribution system, and a method for detecting a quantum signal.

BACKGROUND ART

With the spread of the Internet, there is an increasing social need for encryption technology such as secrecy and tamper prevention of communication and personal authentication. From such a background, in order to ensure communication security, use of quantum key distribution, which is a technology for sharing a secure secret key consisting of random numbers between remote locations, is in the spotlight because it makes eavesdropping difficult in principle (Patent Literatures 1 and 2).

On the other hand, various eavesdropping attempts such as side channel attacks have been made on quantum cryptographic communications using quantum keys. Among them, there has been known an eavesdropping technique called a time shift attack (Non Patent Literature 1) with which an eavesdropper eavesdrops by manipulating a time at which a quantum signal reaches a photon detector without directly eavesdropping on the quantum signal by utilizing the vulnerability of the photon detector that detects the quantum signal.

CITATION LIST

Patent Literature

Patent Literature 1: Japanese Unexamined Patent Application Publication No. 2011-75577
Patent Literature 2: Japanese Unexamined Patent Application Publication No. 2019-125961

Non Patent Literature

Non Patent Literature 1: Bing Qi, et. Al., "TIME-SHIFT ATTACK IN PRACTICAL QUANTUM CRYPTOSYSTEMS", 2007, Quantum Information and Computation, vol. 7, pp. 073-082

SUMMARY OF INVENTION

Technical Problem

In general, in quantum key distribution, a plurality of photon detectors are used to detect a quantum signal. Ideally, the quantum signal is carried by one photon, but actually, the quantum signal may be carried by two or more photons. However, since the intensity of the quantum signal is weak in any case, an avalanche photodiode (APD) capable of amplifying the received weak signal and outputting the amplified signal is used for a quantum detector. In the APD, an electron avalanche phenomenon results from electrons generated when a photon is incident in a state where a reverse bias exceeding a breakdown voltage is applied, which makes it possible to amplify a signal. Therefore, in quantum key distribution, a reverse bias is applied to the APD in such a manner that its application timing is synchronized with a timing at which a photon of the quantum signal is incident (e.g., Patent Literature 1). FIG. 20 schematically illustrates a timing at which a voltage is applied to the APD and a degree of dependence of photon detection efficiency on time. When the timing at which the reverse bias is applied to the APD coincides with the timing at which the photon is incident, the photon detection efficiency of the APD is maximized. However, it is difficult to strictly match the timing at which the photon is incident with the timing at which the reverse bias is applied to the APD, and there is a time difference between the timing at which the reverse bias is applied to the APD and the timing at which the photon is incident. It is known that the photon detection efficiency of the APD decreases as the time difference increases. That is, the photon detection efficiency of the APD depends on the timing at which the photon is incident.

In quantum key distribution, while a plurality of photon detectors (APD) are used, it is preferable that the photon detectors have the same photon detection efficiency to accurately detect a quantum signal. However, the photon detectors have individual differences in degree of dependence of photon detection efficiency on incident timing. FIG. 21 illustrates examples of degrees of dependence of photon detection efficiency on incident timing in the plurality of photon detectors. In the examples illustrated in FIG. 21, bits 0 and 1 of the X basis and bits 0 and 1 of the Z basis are detected by four photon detectors. As illustrated in FIG. 21, even though photons are incident at the same timing (e.g., timing T in FIG. 21), photon detection efficiency varies between the plurality of photon detectors.

Since each of the plurality of photon detectors is allocated to each bit of one of the bases of the quantum signal, if there is a variation in degree of dependence of photon detection efficiency on incident timing between the photon detectors, the detection efficiency of each bit of each basis is analyzed by a time shift attack, and as a result, a situation in which eavesdropping is permitted may occur. Therefore, it is required to prevent or suppress the influence of degree of dependence of photon detection efficiency on incident timing in the photon detector.

The present invention has been made in view of the above circumstances, and an object thereof is to prevent eavesdropping in quantum key distribution.

Solution to Problem

A reception device according to an aspect of the present invention includes: a decoding unit configured to decode a quantum signal incident thereinto; a plurality of detectors configured to detect photons of the decoded quantum signal output from the decoding unit; a signal processing unit configured to detect bits of the decoded quantum signal based on photon detection results of the plurality of detectors; and a control unit configured to perform switching processing by switching destinations to which two decoded quantum signals corresponding to one encoding basis are output between two of the detectors constituting a pair corresponding to the one encoding basis, and switching the bits detected by the signal processing unit based on the respective photon detection results of the two detectors constituting the pair.

A quantum key distribution system according to an aspect of the present invention includes: a transmission device configured to output a quantum signal used for quantum key distribution; and a reception device configured to receive the quantum signal, in which the reception device includes: a decoding unit configured to decode the quantum signal incident thereinto; a plurality of detectors configured to detect photons of the decoded quantum signal output from the decoding unit; a signal processing unit configured to detect bits of the decoded quantum signal based on photon detection results of the plurality of detectors; and a control unit configured to perform switching processing by switching destinations to which two decoded quantum signals corresponding to one encoding basis are output between two of the detectors constituting a pair corresponding to the one encoding basis, and switching the bits detected by the signal processing unit based on the respective photon detection results of the two detectors constituting the pair.

A method for detecting a quantum signal according to an aspect of the present invention includes: decoding an incident quantum signal; detecting photons of the decoded quantum signal by a plurality of detectors; detecting bits of the decoded quantum signal based on photon detection results of the plurality of detectors; and switching destinations to which two decoded quantum signals corresponding to one encoding basis are output between two of the detectors constituting a pair corresponding to the one encoding basis, and switching the bits detected based on the respective photon detection results of the two detectors constituting the pair.

Advantageous Effects of Invention

According to the present invention, it is possible to prevent eavesdropping in quantum key distribution.

BRIEF DESCRIPTION OF DRAWINGS

FIG. 3 is a diagram illustrating corresponding relationships between encoding bases and bits.

FIG. 15 is a diagram illustrating corresponding relationships between encoding bases and bits.

FIG. 17 is a diagram illustrating a relationship between a polarization plane of a light pulse and a single-photon detector that detects the light pulse.

EXAMPLE EMBODIMENT

Figure 1:
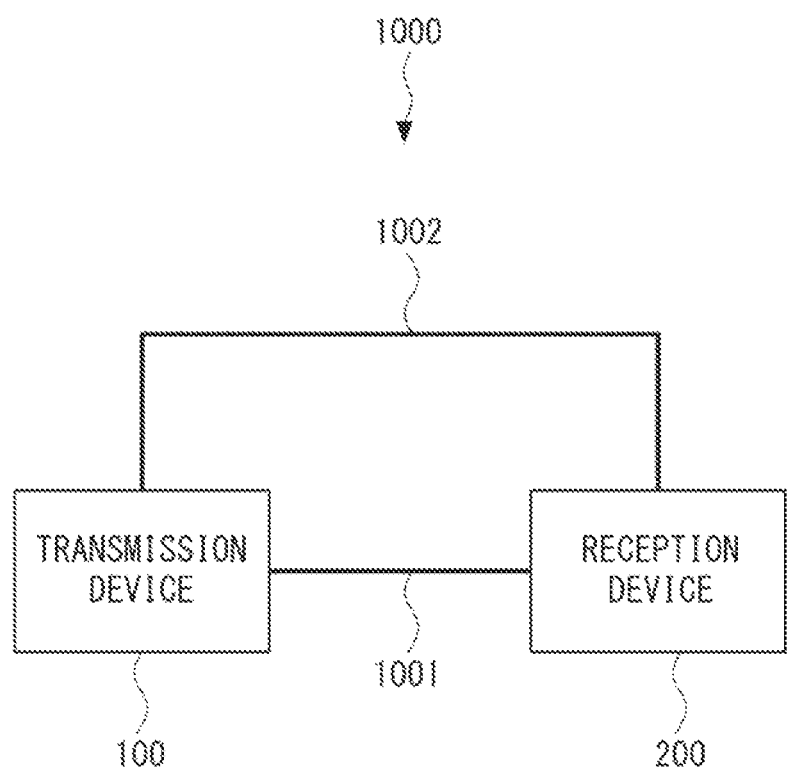
FIG. 1 is a diagram schematically illustrating a configuration of a quantum key distribution system according to a first example embodiment.

Hereinafter, example embodiments of the present invention will be described with reference to the drawings. In the drawings, the same elements are denoted by the same reference signs, and redundant description will be omitted as necessary.

First Example Embodiment

A quantum key distribution system according to a first example embodiment will be described. FIG. 1 schematically illustrates a configuration of a quantum key distribution system 1000 according to the first example embodiment. The quantum key distribution system 1000 is configured as one to which a BB84 protocol in a phase encoding type is applied, and includes a transmission device 100, a reception device 200, and transmission paths 1001 and 1002.

The transmission device 100 transmits quantum signals and other signals (e.g., synchronization signals) to the reception device 200 via the transmission path 1001 configured as a secret communication path. Furthermore, the transmission device 100 and the reception device 200 can transmit and receive signals including, for example, basis information, test bits, error correction information, and the like via the transmission path 1002 that is a public communication path.

Figure 2:
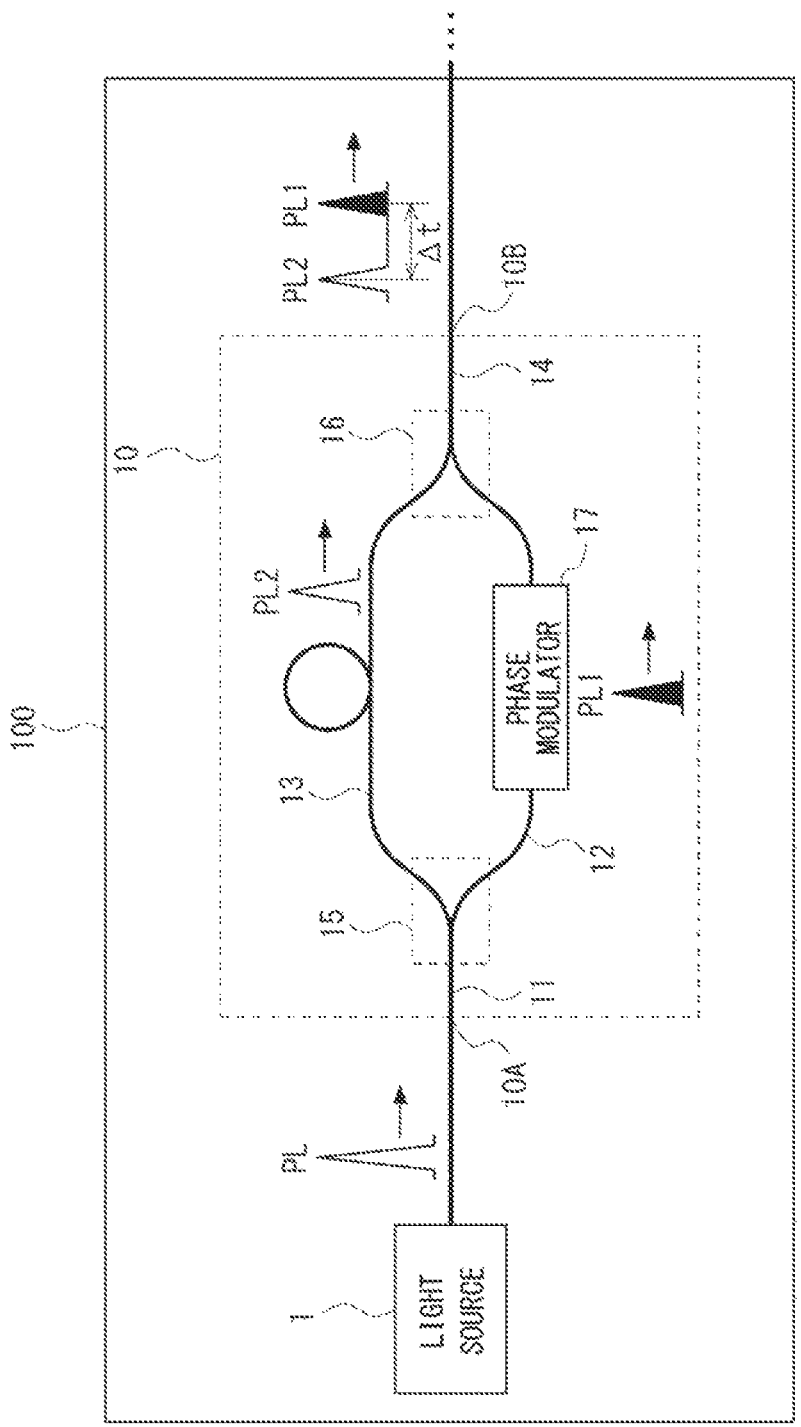
FIG. 2 is a diagram schematically illustrating a configuration of a transmission device according to the first example embodiment.

FIG. 2 schematically illustrates a configuration of the transmission device 100 according to the first example embodiment. The transmission device 100 includes a light source 1 and an interferometer 10.

The light source 1 generates a light pulse PL having a predetermined intensity, which is monochromatic light having a predetermined wavelength. The light source 1 may be constituted by, for example, a semiconductor laser module, but is not limited thereto. The light source 1 is driven by a control circuit (not illustrated) to generate light pulses at regular intervals (e.g., intervals of several nanoseconds). Note that the intensity of the light pulse PL can be adjusted to a predetermined intensity by any method. For example, the intensity of the light pulse PL may be adjusted by installing a light attenuator or an intensity modulator inside the light source 1, or the intensity of the light pulse PL may be adjusted by installing a light attenuator or an intensity modulator, which is not illustrated, outside the light source 1. It goes without saying that the predetermined intensity here means an intensity weak to such an extent as to be suitable for use in quantum key distribution.

The interferometer 10 is constituted by an asymmetric Mach-Zehnder interferometer including optical waveguides 11 to 14, a demultiplexer 15, and a multiplexer 16. An input 10A of the interferometer 10 and an input of the demultiplexer 15 are connected to each other by the optical waveguide 11. One of two outputs of the demultiplexer 15 and one of two inputs of the multiplexer 16 are connected to each other by the optical waveguide 12. The other one of the two outputs of the demultiplexer 15 and the other one of the two inputs of the multiplexer 16 are connected to each other by the optical waveguide 13. An output of the multiplexer 16 and an output 10B of the interferometer 10 are connected to each other by the optical waveguide 14. For example, the optical waveguide 13 is constituted by a waveguide having a longer optical path length than the optical waveguide 12.

A phase modulator 17 is installed at the optical waveguide 12. For example, a general LN modulator or the like may be used as the phase modulator 17, but the phase modulator 17 is not limited thereto.

The light pulse PL output from the light source 1 is incident into the input 10A of the interferometer 10. The incident light pulse PL is demultiplexed by the demultiplexer 15 into a light pulse PL1 propagating through the optical waveguide 12 and a light pulse PL2 propagating through the optical waveguide 13.

Since the optical waveguide 13 has a longer optical path length than the optical waveguide 12, the light pulse PL2 propagating through the optical waveguide 13 is delayed by $\Delta t$ as compared with the light pulse PL1 propagating through the optical waveguide 12 when being incident into the multiplexer 16. Since the light pulse PL2 propagates with a delay of $\Delta t$ relative to the light pulse PL1, hereinafter, the light pulse PL1 will be referred to as a preceding pulse (also referred to as a first light pulse) PL1, and the light pulse PL2 will be referred to as a following pulse (also referred to as a second light pulse) PL2.

The phase of the preceding pulse PL1 propagating through the optical waveguide 12 is modulated by the phase modulator 17. Whenever a preceding pulse PL1 is input, the phase modulator 17 randomly selects one of the two encoding bases, and modulates the phase of the preceding pulse PL1 using the selected encoding basis. FIG. 3 illustrates corresponding relationships between encoding bases and bits. In a first encoding basis (e.g., Z basis), when the phase shift of the preceding pulse PL1 is 0, the corresponding bit is "0", and when the phase shift of the preceding pulse PL1 is $\pi$, the corresponding bit is "1". In a second encoding basis (e.g., Y basis), when the phase shift of the preceding pulse PL1 is $\pi/2$, the corresponding bit is "0", and when the phase shift of the preceding pulse PL1 is $3\pi/2$, the corresponding bit is "1".

When the first encoding basis (e.g., Z basis) is selected, the phase modulator 17 shifts the phase of the preceding pulse PL1 by $\kappa$ or by $\pi$ to encode the preceding pulse PL1. When the second encoding basis (e.g., Y basis) is selected, the phase modulator 17 shifts the phase of the preceding pulse PL1 by $\pi/2$ or by $3\pi/2$ to encode the preceding pulse PL1. The preceding pulse PL1 of which the phase has been modulated is incident into the multiplexer 16 after propagating through the optical waveguide 12.

The multiplexer 16 multiplexes the preceding pulse PL1 and the following pulse PL2 and couples them to the optical waveguide 14. As a result, the preceding pulse PL1 and the following pulse PL2 are transmitted as two continuous light pulses to the reception device 200 through the transmission path 1001.

Figure 4:
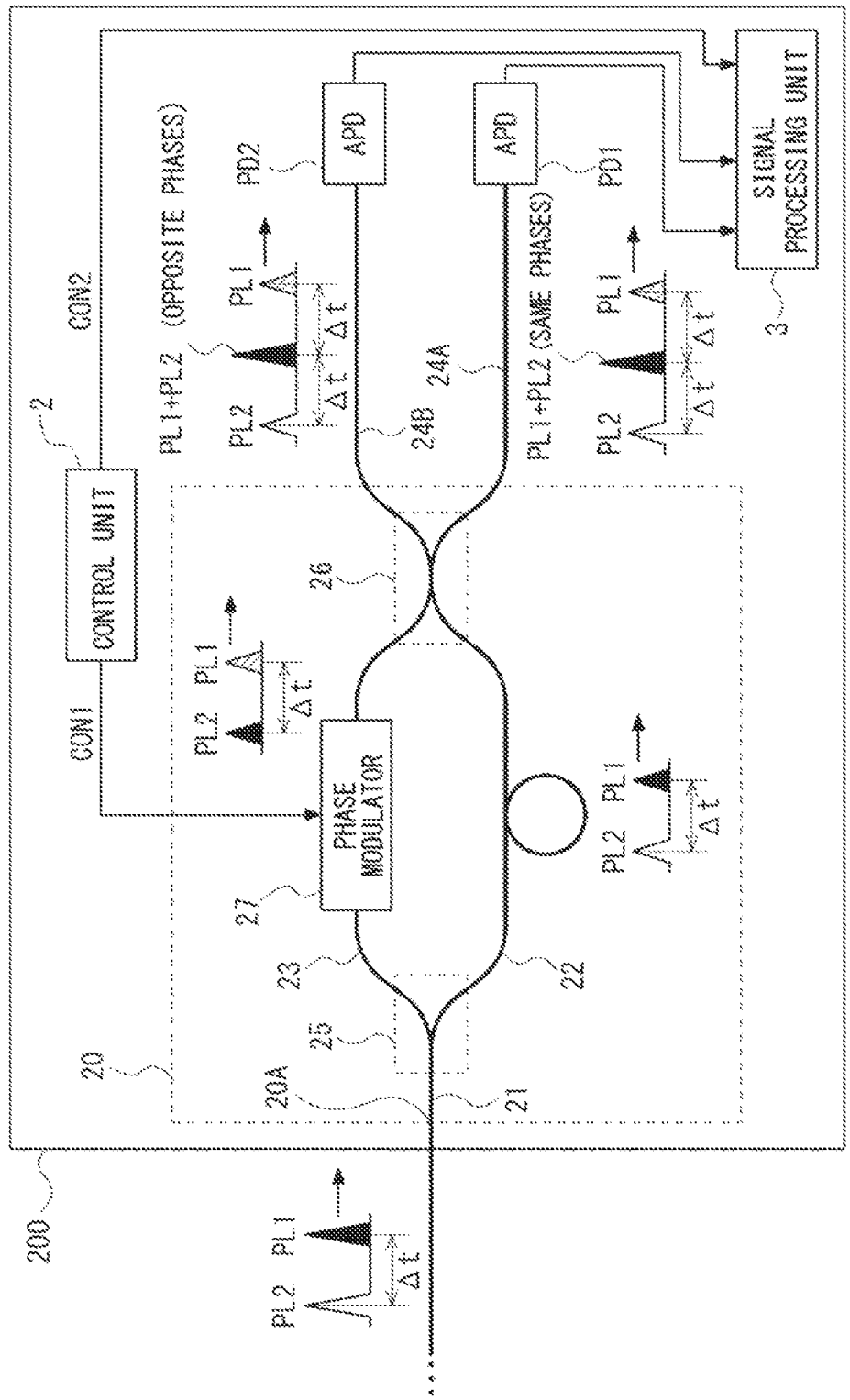
FIG. 4 is a diagram schematically illustrating a configuration of a reception device according to the first example embodiment.

FIG. 4 schematically illustrates a configuration of the reception device 200 according to the first example embodiment. The reception device 200 includes an interferometer 20, two single-photon detectors PD1 and PD2 (also referred to as first and second detectors), a control unit 2, and a signal processing unit 3. Hereinafter, an avalanche photodiode (APD) is used as the single-photon detector.

The interferometer 20 is configured as a decoding unit including an asymmetric Mach-Zehnder interferometer that decodes a quantum signal, the interferometer 20 including optical waveguides 21 to 23, a demultiplexer 25, a multiplexer/demultiplexer 26, and a phase modulator 27. An input 20A of the interferometer 20 and an input of the demultiplexer 25 are connected to each other by the optical waveguide 21. One of two outputs of the demultiplexer 25 and one of two inputs of the multiplexer/demultiplexer 26 are connected to each other by the optical waveguide 22 (also referred to as a first path). The other one of the two outputs of the demultiplexer 25 and the other one of the two inputs of the multiplexer/demultiplexer 26 are connected to each other by the optical waveguide 23 (also referred to as a second path). One output of the multiplexer/demultiplexer 26 is connected to the single-photon detector PD1 by an optical waveguide 24A, and the other output of the multiplexer/demultiplexer 26 is connected to the single-photon detector PD2 by an optical waveguide 24B. The optical waveguide 22 is constituted by a waveguide having a longer optical path length than the optical waveguide 23.

The phase modulator 27 is inserted into the optical waveguide 23. For example, a general LN modulator or the like may be used as the phase modulator 27, but the phase modulator 27 is not limited thereto.

The two continuous light pulses output from the transmission device 100 are incident into the input 20A of the interferometer 20. The incident two continuous light pulses are demultiplexed by the demultiplexer 25 into two continuous light pulses propagating through the optical waveguide 22 and two continuous light pulses propagating through the optical waveguide 23.

The optical waveguide 22 has an optical path length in which the light pulse propagating therethrough is delayed by $\Delta t$ as compared with the light pulse propagating through the optical waveguide 23. As a result, the two continuous light pulses propagating through the optical waveguide 22 are delayed by $\Delta t$ as compared with the two continuous light pulses propagating through the optical waveguide 23 when being incident into the multiplexer/demultiplexer 26.

The phases of the two continuous light pulses propagating through the optical waveguide 23 are modulated by the phase modulator 27. Whenever two continuous light pulses are input, the phase modulator 27 randomly selects one of the two encoding bases, and modulates the phase of the following pulse PL2 by 0 or by $\pi/2$ using the selected encoding basis.

Specifically, when the first encoding basis (e.g., Z basis) is selected, the phase modulator 27 shifts the phase of the light pulse PL2 by 0 (that is, no modulation). When the second encoding basis (e.g., Y basis) is selected, the phase modulator 27 shifts the phase of the following pulse PL2 by $\pi/2$. The following pulse PL2 of which the phase has been modulated is incident into the multiplexer/demultiplexer 26 after propagating through the optical waveguide 23.

The two continuous light pulses having passed through the optical waveguide 22 and the two continuous light pulses having passed through the optical waveguide 23 are multiplexed by the multiplexer/demultiplexer 26 to form three continuous light pulses. The preceding pulse PL1 having passed through the optical waveguide 23 becomes a leading pulse of the three continuous light pulses, and the following pulse PL2 having passed through the optical waveguide 22 becomes a trailing pulse of the three continuous light pulses. The following pulse PL2 having been modulated in the optical waveguide 23 and the preceding pulse PL1 having passed through the optical waveguide 22 interfere with each other and form a central pulse between the leading pulse and the trailing pulse.

Which one of the single-photon detectors PD1 and PD2 detects the photon of the central pulse depends on the phase shift by the phase modulator 17 and the phase shift by the phase modulator 27. In other words, which one of the single-photon detectors PD1 and PD2 detects the photon of the center pulse depends on whether the following pulse PL2 having been modulated by the phase modulator 27 and the preceding pulse PL1 having passed through the optical waveguide 22 interfere with each other in the same phase or in opposite phases in the multiplexer/demultiplexer 26. In the present configuration, when the following pulse PL2 having been modulated by the phase modulator 27 and the preceding pulse PL1 having passed through the optical waveguide 22 interfere with each other in the same phase, the central pulse propagates through the optical waveguide 24A, and its photon is detected by the single-photon detector PD1, and when the following pulse PL2 having been modulated by the phase modulator 27 and the preceding pulse PL1 having passed through the optical waveguide 22 interfere with each other in opposite phases, the central pulse propagates through the optical waveguide 24B, and its photon is detected by the single-photon detector PD2. When the photon is detected by the single-photon detector PD1, the signal processing unit 3 acquires bit information "0" according to a detection signal of the single-photon detector PD1. When the photon is detected by the single-photon detector PD2, the signal processing unit 3 acquires bit information "1" according to a detection signal of the single-photon detector PD2. In the present configuration, a quantum signal transmitted as two continuous light pulses as described above is decoded by the interferometer 20.

When the phase shift in the interferometer 10 is 0 and the phase shift in the interferometer 20 is 0 (also referred to as a first combination), the phases are the same, and thus, a photon is detected by the single-photon detector PD1. When the phase shift in the interferometer 10 is $\pi$ and the phase shift in the interferometer 20 is 0 (also referred to as a second combination), the phases are opposite, and thus, a photon is detected by the single-photon detector PD2. These two cases are cases where the first encoding basis (e.g., Z basis) is selected in both the transmission device 100 and the reception device.

When the phase shift in the interferometer 10 is $\pi/2$ and the phase shift in the interferometer 20 is $\pi/2$ (also referred to as a third combination), the phases are the same, and thus, a photon is detected by the single-photon detector PD1. When the phase shift in the interferometer 10 is $3\pi/2$ and the phase shift in the interferometer 20 is $\pi/2$ (also referred to as a fourth combination), the phases are opposite, and thus, a photon is detected by the single-photon detector PD2. These two cases are cases where the second encoding basis (e.g., Y basis) is selected in both the transmission device 100 and the reception device 200.

When modulation is performed in a phase shift combination other than the above-described four phase shift combinations (that is, when the encoding bases selected by the transmission device 100 and the reception device 200 are different from each other), a probability that a photon is detected by each of the single-photon detectors PD1 and PD2 is 50%. For example, when the phase shift in the interferometer 10 is 0 and the phase shift in the interferometer 20 is $\pi/2$, the probability that the photon is detected by the single-photon detector PD1 is 50%, and a probability that a photon is detected by the single-photon detector PD2 is 50%. In this case, accurate reception cannot be performed, and accordingly, the received information is discarded and is not used for generating an encryption key.

In this manner, in the present configuration, a plurality of single-photon detectors is used. However, as described above, the single-photon detectors have individual differences in degree of dependence of photon detection sensitivity on incident timing. Such individual differences cause vulnerability to, for example, the above-described time shift attack. In this regard, if the degrees of dependence of photon detection sensitivity on incident timing in the plurality of single-photon detectors can be averaged, resistance to eavesdropping using a time shift attack or the like can be improved.

Therefore, in the present configuration, the control unit 2 gives a control signal CON1 to the interferometer 20 to switch the phase shift mode, randomly inverts the phase shift applied to the light pulse in the interferometer 20, in other words, shifts the phase by $\pi$, to average degrees of dependence of photon detection sensitivity on incident timing in the plurality of single-photon detectors.

Here, the mode in which the phase shift is performed in any of the above-described four combinations (first to fourth combinations) will be referred to as a first phase shift mode. In addition, the mode in which the phase shift in the phase modulator 27 of the interferometer 20 is inverted with respect to the first phase shift mode will be called a second phase shift mode.

In the first phase shift mode, when the phase shift in the interferometer 10 is 0 and the phase shift in the interferometer 20 is 0 (first combination), the phases are the same, and thus, a photon (also referred to as a first decoded signal) is detected by the single-photon detector PD1. On the other hand, in the second phase shift mode in which the phase shift in the interferometer 20 is inverted, the phase shift in the interferometer 10 is 0 and the phase shift in the interferometer 20 is $\pi$, and the phases become opposite, and thus, a photon (also referred to as a first decoded signal) is detected by the single-photon detector PD2.

In the first phase shift mode, when the phase shift in the interferometer 10 is $\pi$ and the phase shift in the interferometer 20 is 0 (second combination), a photon (also referred to as a second decoded signal) is detected by the single-photon detector PD2. On the other hand, in the second phase shift mode in which the phase shift in the interferometer 20 is inverted, since the phase shift in the interferometer 10 is π and the phase shift in the interferometer 20 is π, and the phases become the same, and thus, a photon (also referred to as a second decoded signal) is detected by the single-photon detector PD1.

In the first phase shift mode, when the phase shift in the interferometer 10 is π/2 and the phase shift in the interferometer 20 is π/2 (third combination), a photon (also referred to as a third decoded signal) is detected by the single-photon detector PD1. On the other hand, in the second phase shift mode in which the phase shift in the interferometer 20 is inverted, since the phase shift in the interferometer 10 is π/2 and the phase shift in the interferometer 20 is 3π/2, and the phases become opposite, and thus, a photon (also referred to as a third decoded signal) is detected by the single-photon detector PD2.

In the first phase shift mode, when the phase shift in the interferometer 10 is π/2 and the phase shift in the interferometer 20 is 3π/2 (fourth combination), a photon (also referred to as a fourth decoded signal) is detected by the single-photon detector PD2. On the other hand, in the second phase shift mode in which the phase shift in the interferometer 20 is inverted, since the phase shift in the interferometer 10 is π/2 and the phase shift in the interferometer 20 is π/2, and the phases become the same, and thus, a photon (also referred to as a fourth decoded signal) is detected by the single-photon detector PD1.

As described above, when the phase shift in the interferometer 20 is inverted between the first phase shift mode and the second phase shift mode, even though the phase shift in the interferometer 10 in the first phase shift mode and the phase shift in the interferometer 10 in the second phase shift mode are the same, the single-photon detector that detects a photon is replaced.

Accordingly, the control unit 2 gives a control signal CON2 to the signal processing unit 3 to control the processing of the signal processing unit 3 so that the bits detected by the single-photon detectors PD1 and PD2 in the first phase shift mode are 0 and 1, respectively, and the bits detected by the single-photon detectors PD1 and PD2 in the second phase shift mode are 1 and 0, respectively.

Therefore, by randomly switching between the operation in the first phase shift mode and the operation in the second phase shift mode through the control unit 2 so that the operation in the first phase shift mode and the operation in the second phase shift mode are performed in a ratio of 1:1 or in a ratio of about 1:1, it is possible to average degrees of dependence of photon detection sensitivity on incident timing in the respective single-photon detectors.

As described above, according to the present configuration, by averaging the degrees of dependence of photon detection sensitivity on incident timing in the single-photon detectors, eavesdropping can be suitably prevented. In particular, it is possible to prevent eavesdropping using a time shift attack using the degrees of dependence of photon detection sensitivity on incident timing in the single-photon detectors.

Second Example Embodiment

Figure 5:
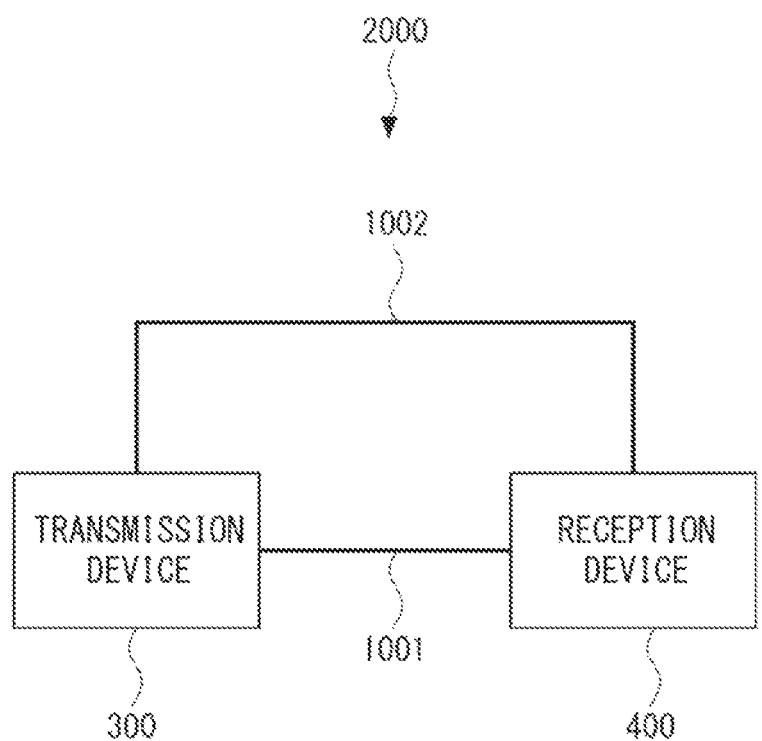
FIG. 5 is a diagram schematically illustrating a configuration of a quantum key distribution system according to a second example embodiment.

A quantum key distribution system 2000 according to a second example embodiment will be described. FIG. 5 schematically illustrates a configuration of a quantum key distribution system 2000 according to the second example embodiment. The quantum key distribution system 2000 is a modified example of the quantum key distribution system 1000, and has a configuration in which the transmission device 100 and the reception device 200 of the quantum key distribution system 1000 are replaced with a transmission device 300 and a reception device 400, respectively.

Figure 6:
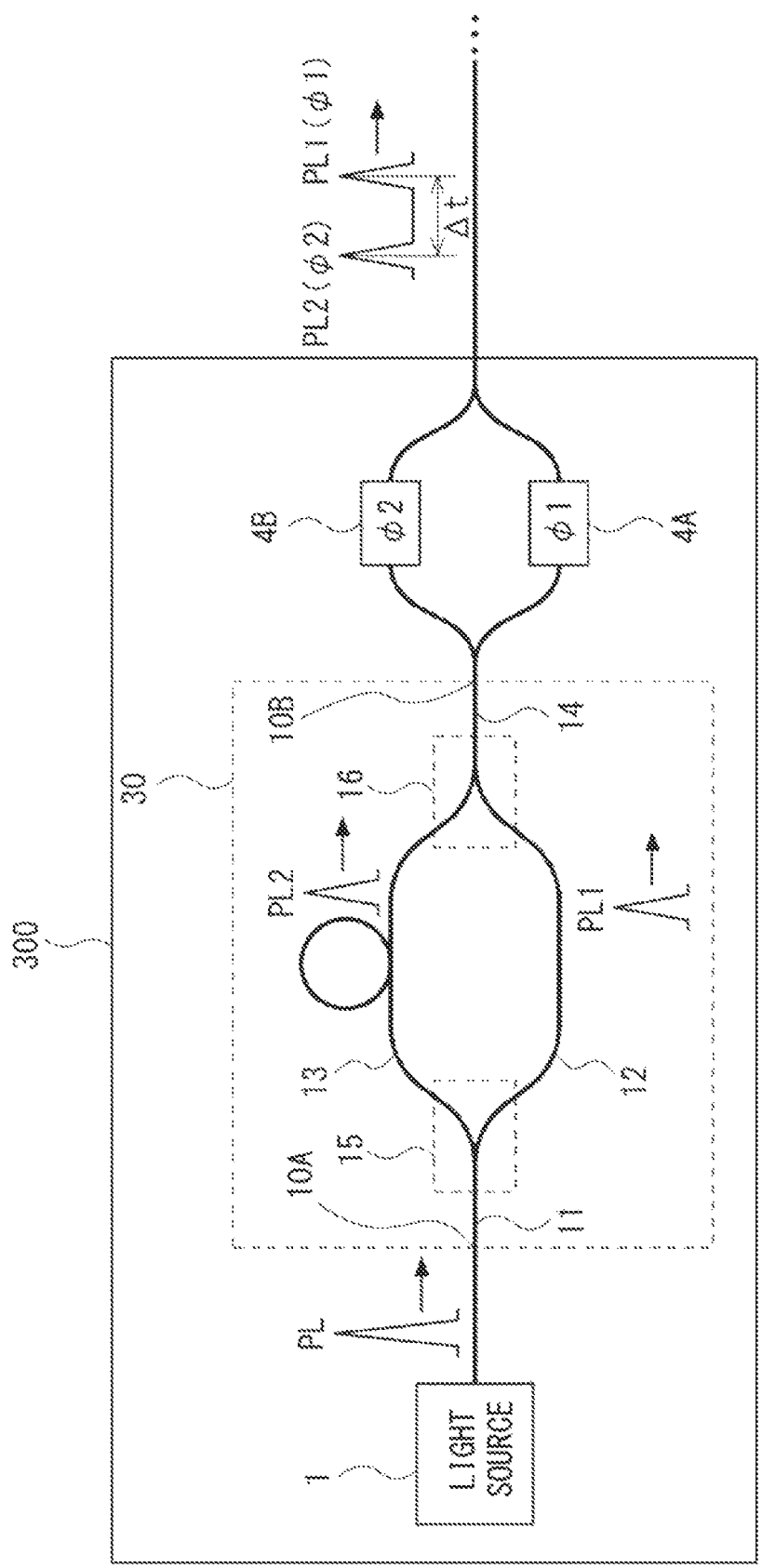
FIG. 6 is a diagram schematically illustrating a configuration of a transmission device according to the second example embodiment.

FIG. 6 schematically illustrates a configuration of the transmission device 300 according to the second example embodiment. The transmission device 300 has a configuration in which the interferometer 10 of the transmission device 100 is replaced with an interferometer 30 and phase modulators 4A and 4B are added.

The interferometer 30 has a configuration in which the phase modulator 17 is removed from the interferometer 10.

The phase modulators 4A and 4B are inserted in parallel to each other between an output 10B of the interferometer 30 and an output of the transmission device 300. Here, a phase shift by the phase modulator 4A is denoted by φ1, and a phase shift by the phase modulator 4B is denoted by φ2.

Figure 7:
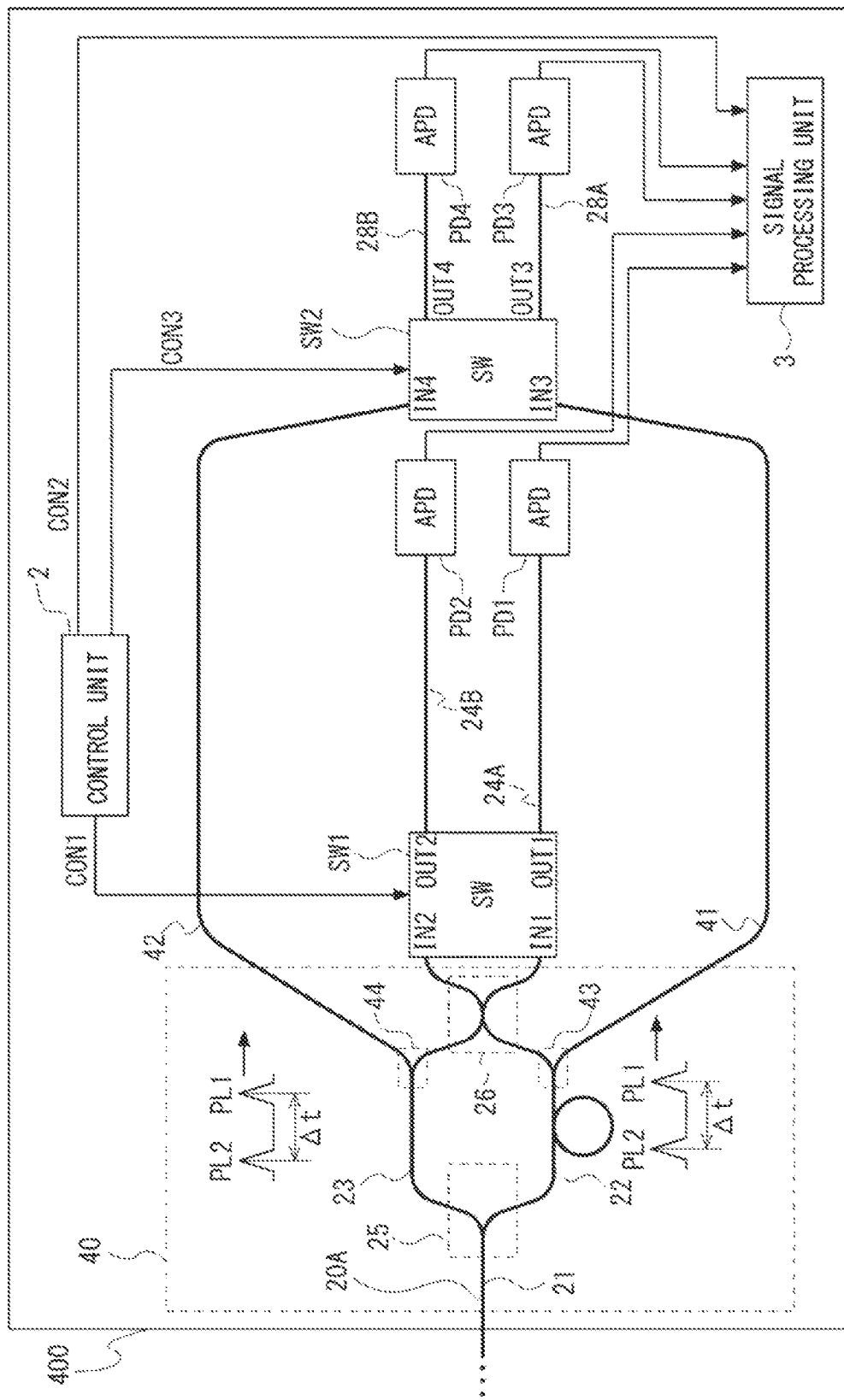
FIG. 7 is a diagram schematically illustrating a configuration of a reception device according to the second example embodiment.

FIG. 7 schematically illustrates a configuration of the reception device 400 according to the second example embodiment. The reception device 400 has a configuration in which the interferometer 20 of the reception device 200 is replaced with an interferometer 40 and optical switches SW1 and SW2 are added.

The interferometer 40 is configured as a decoding unit that decodes a quantum signal, and has a configuration in which the phase modulator 27 of the interferometer 20 is removed, and optical waveguides 41 and 42 and demultiplexers 43 and 44 are added.

The optical switch SW1 (also referred to as a first optical switch) has two inputs IN1 and IN2 (also referred to as first and second inputs) and two outputs OUT1 and OUT2 (also referred to as first and second outputs). According to a control signal CON1 (also referred to as a first control signal) given from the control unit 2, the optical switch SW1 connects the input IN1 and the output OUT1 to each other and connects the input IN2 and the output OUT2 to each other in a first mode, and connects the input IN1 and the output OUT2 to each other and connects the input IN2 and the output OUT1 to each other in a second mode.

One of two outputs of the multiplexer/demultiplexer 26 is connected to the input IN1, and the other one of the two outputs of the multiplexer/demultiplexer 26 is connected to the input IN2. The output OUT1 is connected to the single-photon detector PD1 by the optical waveguide 24A, and the output OUT2 is connected to the single-photon detector PD2 by the optical waveguide 24B.

The demultiplexer 43 is inserted into the optical waveguide 22 to demultiplex the light pulse propagating through the optical waveguide 22 into the optical waveguide 22 and the optical waveguide 41.

The demultiplexer 44 is inserted into the optical waveguide 23 and demultiplex the light pulse propagating through the optical waveguide 23 into the optical waveguide 23 and the optical waveguide 42.

As in the first example embodiment, the optical waveguide 22 has an optical path length in which a light pulse propagating therethrough is delayed by Δt as compared with a light pulse propagating through the optical waveguide 23. As a result, a timing at which two continuous light pulses are incident into the input IN1 of the optical switch SW1 from the optical waveguide 22 is delayed by Δt from a timing at which two continuous light pulses are incident into the input IN2 of the optical switch SW1 from the optical waveguide 23.

The optical switch SW2 (also referred to as a second optical switch) has two inputs IN3 and IN4 (also referred to as third and fourth inputs) and two outputs OUT3 and OUT4 (also referred to as third and fourth outputs). According to a control signal CON3 (also referred to as a second control signal) given from the control unit 2, the optical switch SW2 connects the input IN3 and the output OUT3 to each other and connects the input IN4 and the output OUT4 to each other in the first mode, and connects the input IN3 and the output OUT4 to each other and connects the input IN4 and the output OUT3 to each other in the second mode.

The optical waveguide 41 is connected to the input IN3, and the optical waveguide 42 is connected to the input IN4. The output OUT3 is connected to a single-photon detector PD3 (also referred to as a third detector) by an optical waveguide 28A, and the output OUT4 is connected to a single-photon detector PD4 (also referred to as a fourth detector) by an optical waveguide 28B.

The light pulse (photon) detection results of the single-photon detectors PD1 to PD4 are output to the signal processing unit 3.

Next, transmission and reception of quantum signals in the present example embodiment will be described. First, the operations of the transmission device 300 will be described. The two continuous light pulses including a preceding pulse PL1 having passed through the optical waveguide 12 and a following pulse PL2 having passed through the optical waveguide 13 are demultiplexed into two waveguides and input to the phase modulator 4A and the phase modulator 4B. The phase modulator 4A and the phase modulator 4B individually modulate the phase of each of the preceding pulse PL1 and the following pulse PL2. In the present configuration, it is assumed that the phase shift by the phase modulator 4A is 0 or $\pi/2$ ($\varphi1=\{0,\pi/2\}$), and the phase shift by the phase modulator 4B is 0 or $\pi$ ($\varphi2=\{0,\pi\}$). As a result, four non-orthogonal states required by the BB84 protocol are generated.

In the first state, a phase modulation of $\{\varphi1,\varphi2\}=\{0,0\}$ is performed on the preceding pulse PL1 and a phase modulation of $\{\varphi1,\varphi2\}=\{0,\pi\}$ is performed on the following pulse PL2. In this case, when the two continuous light pulses output from the phase modulators 4A and 4B are multiplexed, only a preceding pulse PL1 having an intensity of 1 is present.

In the second state, the same phase modulations as those in the first state are performed but in the reverse order, that is, a phase modulation of $\{\varphi1,\varphi2\}=\{0,\pi\}$ is performed on the preceding pulse PL1, and a phase modulation of $\{\varphi1,\varphi2\}=\{0,0\}$ is performed on the following pulse PL2. In this case, when the two continuous light pulses output from the phase modulators 4A and 4B are multiplexed, only a following pulse PL2 having an intensity of 1 is present.

Here, the first and second states are referred to as "two states belonging to the Z basis", and a bit "0" is assigned to the first state and a bit "1" is assigned to the second state. Since the first and second states are orthogonal states, the first and second states can be easily distinguished from each other by measurement.

In third state, a phase modulation of $\{\varphi1,\varphi2\}=\{\pi/2,\pi\}$ is performed on the preceding pulse PL1 of the two continuous light pulses, and a phase modulation of $\{\varphi1,\varphi2\}=\{\pi/2,\pi\}$ is performed on the following pulse PL2 of the two continuous light pulses. In this case, when the two continuous light pulses output from the phase modulators 4A and 4B are multiplexed, two continuous light pulses including a preceding pulse PL1 having an intensity of ½ and a phase of $\pi/4$ and a following pulse PL2 having an intensity of ½ and a phase of $-\pi/4$ are present.

In the fourth state, the same phase modulations as those in the third state are performed but in the reverse order, that is, a phase modulation of $\{\varphi1,\varphi2\}=\{\pi/2,\pi\}$ is performed on the preceding pulse PL1 of the two continuous light pulses, and a phase modulation of $\{\varphi1,\varphi2\}=\{\pi/2\pi\}$ is performed on the following pulse PL2. In this case, when the two continuous light pulses output from the phase modulators 4A and 4B are multiplexed, two continuous light pulses including a preceding pulse PL1 having an intensity of ½ and a phase of $-\pi/4$ and a following pulse PL2 having an intensity of ½ and a phase of $\pi/4$ are present.

Here, the third and fourth states are referred to as "two states belonging to the Y basis", and a bit "0" is assigned to the third state and a bit "1" is assigned to the fourth state. Since the third and fourth states are orthogonal states, the third and fourth states can be easily distinguished from each other by measurement.

Note that, since a state belonging to the Z basis and a state belonging to the Y basis are not orthogonal to each other, it is not possible to accurately distinguish them from each other by any measurement.

As described above, the four non-orthogonal states required by the BB84 protocol can be realized by the two continuous light pulses and the two phase modulators connected in parallel to each other.

Next, the operations of the reception device 400 will be described. When two continuous light pulses in a state belonging to the Y basis are incident into the interferometer 40, three continuous light pulses are output as in the first example embodiment, and the central pulse is a pulse generated by interference between two light pulses. Since the relative phase of the two continuous light pulses is $+\pi/2$ in the third state and $-\pi/2$ in the fourth state, by designing a phase difference between light passing through the long optical waveguide 22 and light passing through the short optical waveguide 23 in the asymmetric Mach-Zehnder interferometer to be $+\pi/2$, the relative phase of the two continuous light pulses is $\pi$ (opposite phase) in the third state and 0 (same phase) in the fourth state. Therefore, it is possible to distinguish the two states of the Y basis from each other depending on which one of the single-photon detectors PD1 and PD2 has detected a photon.

When light pulses in states belonging to the Z basis are incident into the interferometer 40, the states can of course be distinguished from each other. In the first state of the Z basis, the light pulse incident into the interferometer 40 is only a preceding pulse PL1. In the second state of the Z basis, the light pulse incident into the interferometer 40 is only a following pulse PL2 of which an incident timing is later than that of the preceding pulse PL1 in the first state. Therefore, the two states of the Z basis can be distinguished from each other by matching a detection timing of the single-photon detector PD3 with the preceding pulse PL1 and matching a detection timing of the single-photon detector PD4 with the following pulse PL2.

Next, the averaging of degrees of dependence of photon detection sensitivity on incident timing in the single-photon detectors in the present example embodiment will be described. In the present configuration, as in the first example embodiment, the single-photon detector that detects the bit "0" and the single-photon detector that detects the bit "1" are randomly replaced with each other, thereby averaging degrees of dependence of photon detection sensitivity on incident timing in the single-photon detectors.

Figure 8:
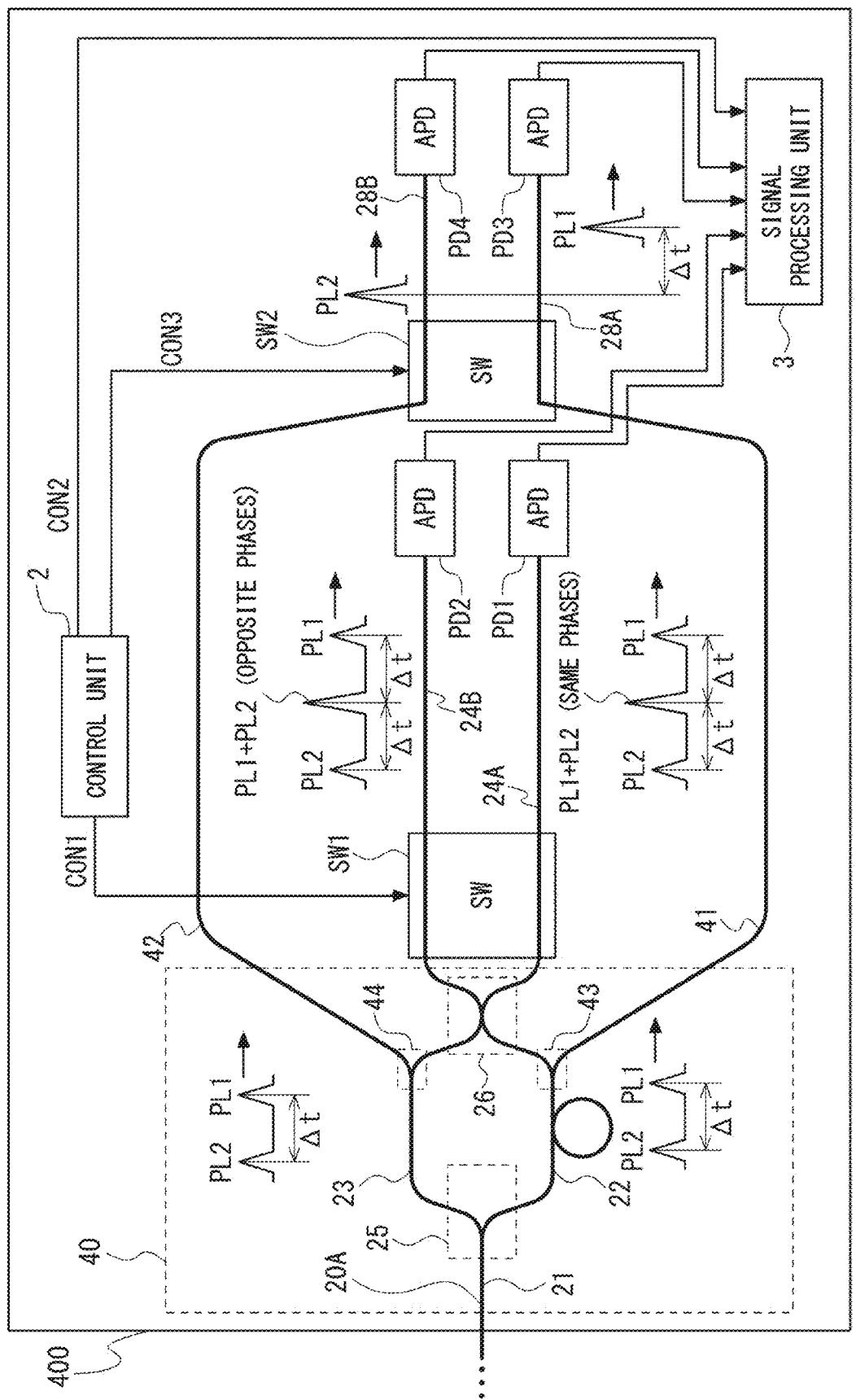
FIG. 8 is a diagram illustrating light pulse paths in a first mode in the reception device according to the second example embodiment.
Figure 9:
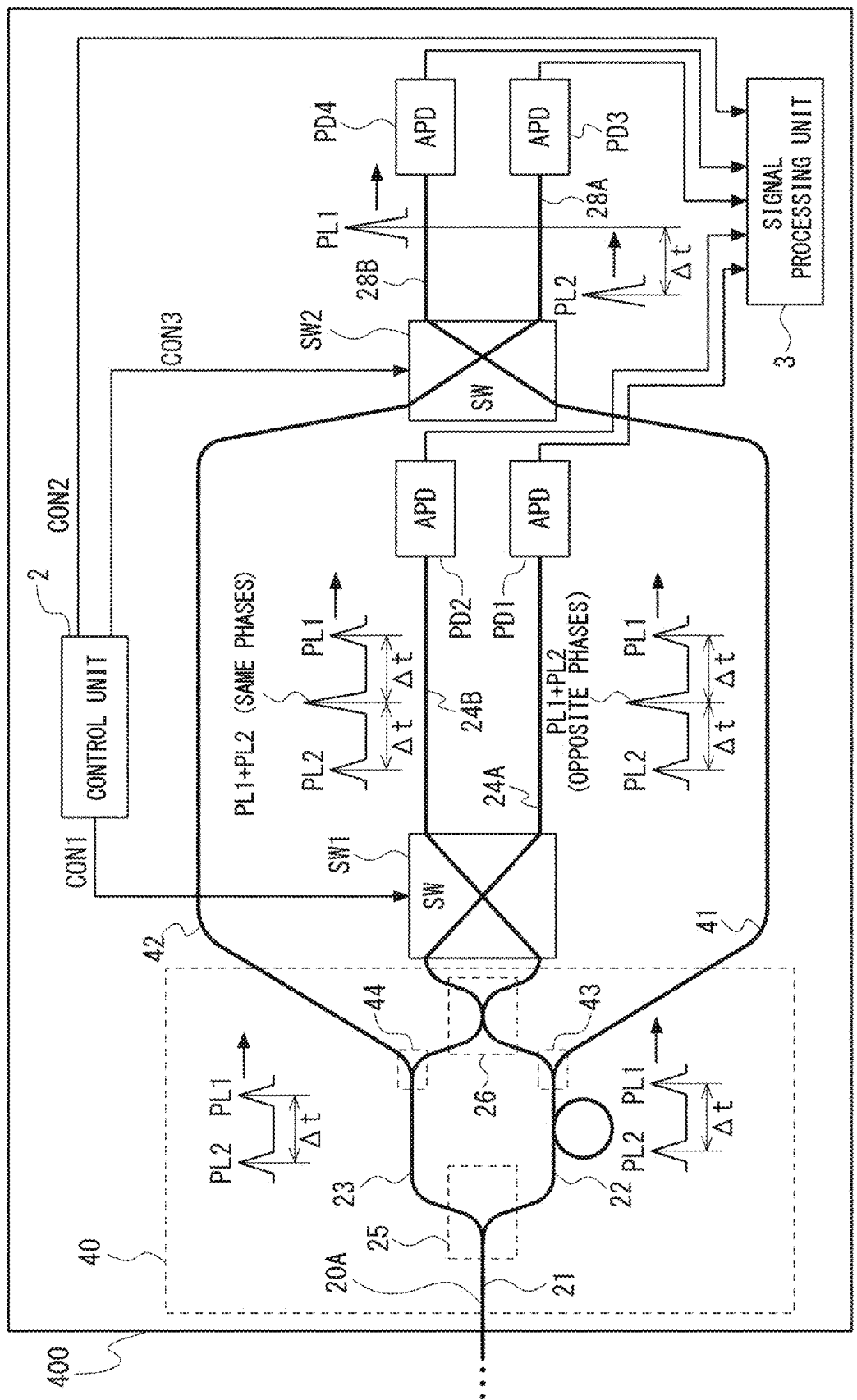
FIG. 9 is a diagram illustrating light pulse paths in a second mode in the reception device according to the second example embodiment.

Hereinafter, FIG. 8 illustrates a light pulse path in the first mode of the reception device 400, and FIG. 9 illustrates a light pulse path in the second mode of the reception device 400.

The photon detection according to the Z basis is realized by the control unit 2 giving a control signal CON3 to the optical switch SW2 to switch the connection between the input and the output and change the light pulse (photon) path. In the first mode, by the optical switch SW2, a light pulse (photon) input from the optical waveguide 41 to the input IN3 in the first state (bit 0) is guided to the single-photon detector PD3 via the output OUT3, and a light pulse (photon) input from the optical waveguide 42 to the input IN4 in the second state (bit 1) is guided to the single-photon detector PD4 via the output OUT4. On the other hand, in the second mode, by the optical switch SW2, a light pulse (photon) input from the optical waveguide 41 to the input IN3 in the first state (bit 0) is guided to the single-photon detector PD4 via the output OUT4, and a light pulse (photon) input from the optical waveguide 42 to the input IN4 in the second state (bit 1) is guided to the single-photon detector PD3 via the output OUT3.

The photon detection according to the Y basis is realized by the control unit 2 giving a control signal CON1 to the optical switch SW1 to switch the connection between the input and the output and change the light pulse (photon) path. In the first mode, by the optical switch SW1, a central pulse (photon) is guided to the single-photon detector PD1 in the third state (bit 0), and a central pulse (photon) is guided to the single-photon detector PD2 in the fourth state (bit 1). In the second mode, by the optical switch SW1, a central pulse (photon) is guided to the single-photon detector PD2 in the third state (bit 0), and a central pulse (photon) is guided to the single-photon detector PD1 in the fourth state (bit 1).

As described above, by switching between the optical switches, even though the phase shift in the interferometer 10 in the first mode and the phase shift in the interferometer 10 in the second mode are the same, the single-photon detector that detect a photon is replaced.

Accordingly, the control unit 2 gives a control signal CON2 to the signal processing unit 3 to switch the mode so that bits detected by the single-photon detectors PD1 and PD3 are 0 and bits detected by the single-photon detectors PD2 and PD2 are 1 in the first mode, and bits detected by the single-photon detectors PD1 and PD2 are 1 and the bits detected by the single-photon detectors PD2 and PD2 are 0 in the second mode.

Therefore, by randomly switching between the operation in the first mode and the operation in the second mode through the control unit 2 so that the operation in the first mode and the operation in the second mode are performed in a ratio of 1:1 or in a ratio of about 1:1, it is possible to average degrees of dependence of photon detection sensitivity on incident timing in the respective single-photon detectors.

As described above, according to the present configuration, by averaging the degrees of dependence of photon detection sensitivity on incident timing in the single-photon detectors, eavesdropping can be suitably prevented. In particular, it is possible to prevent eavesdropping using a time shift attack using the degrees of dependence of photon detection sensitivity on incident timing in the single-photon detectors.

As described above, in the present example embodiment, light pulses are distributed from one interferometer to the single-photon detectors PD3 and PD4 corresponding to the Z basis and the single-photon detectors PD1 and PD2 corresponding to the Y basis. In this regard, the reception device may have another configuration as long as light pulses can be distributed similarly.

Figure 10:
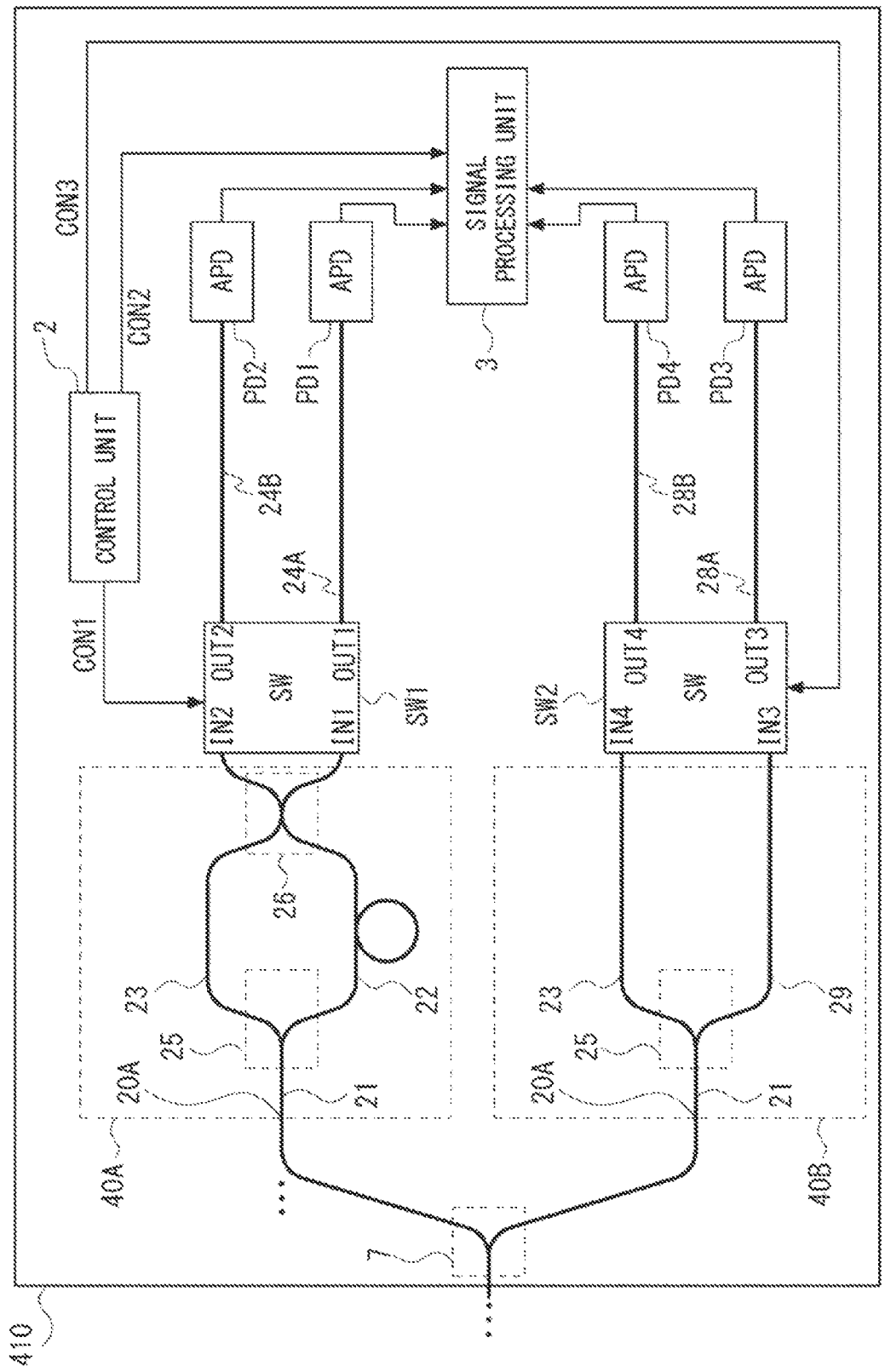
FIG. 10 is a diagram illustrating a modified example of the reception device according to the second example embodiment.

FIG. 10 illustrates a modified example of the reception device according to the second example embodiment. The reception device 410 of FIG. 10 has a configuration in which the interferometer 40 of the reception device 400 is replaced with an interferometer 40A, and a demultiplexer 7 and a branch circuit 40B are added. In the present configuration, the interferometer 40A and the branch circuit 40B constitute a decoding unit that decodes a quantum signal.

The interferometer 40A has a configuration in which the demultiplexers 43 and 44 inserted into the interferometer 40 are removed. Accordingly, the optical waveguides 41 and 42 connected to the demultiplexers 43 and 44 are also removed. Therefore, in the present configuration, a light pulse is input to the optical switch SW2 via the branch circuit 40B.

The two continuous light pulses input to the reception device 410 are first demultiplexed by the demultiplexer 7, and the demultiplexed two continuous light pulses are input to the interferometer 40A and the branch circuit 40B.

The branch circuit 40B has a configuration in which the optical waveguide 22 of the interferometer 20 is replaced with an optical waveguide 29 and the multiplexer/demultiplexer 26 is removed from the interferometer 20. The optical waveguide 29 has a configuration in which the delay path is removed from the optical waveguide 22. In the branch circuit 40B, the optical waveguide 29 is connected to the input IN3 of the optical switch SW2, and the optical waveguide 23 is connected to the input IN4 of the optical switch SW2.

Figure 11:
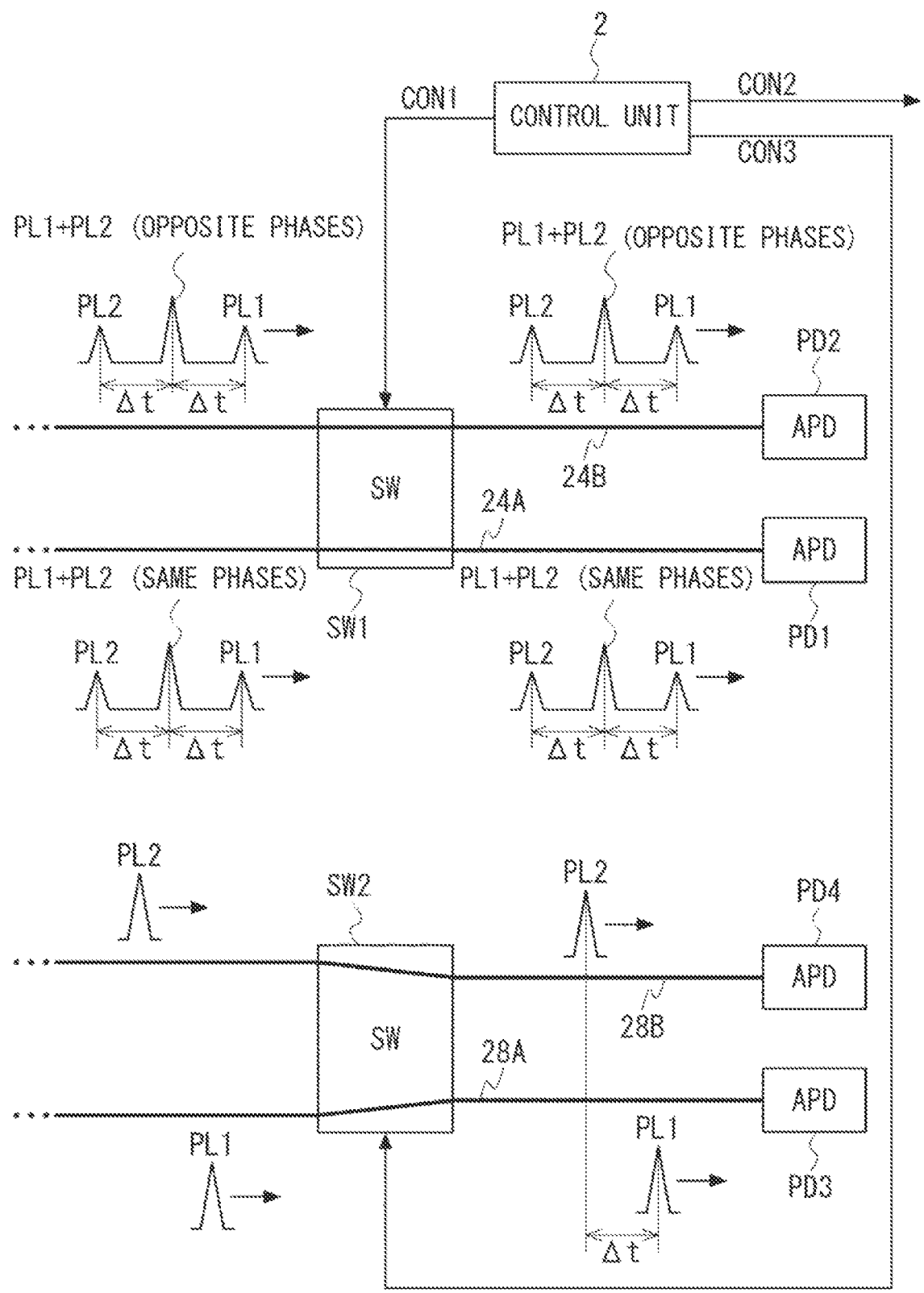
FIG. 11 is a diagram illustrating light pulse paths in a first mode in the modified example of the reception device according to the second example embodiment.
Figure 12:
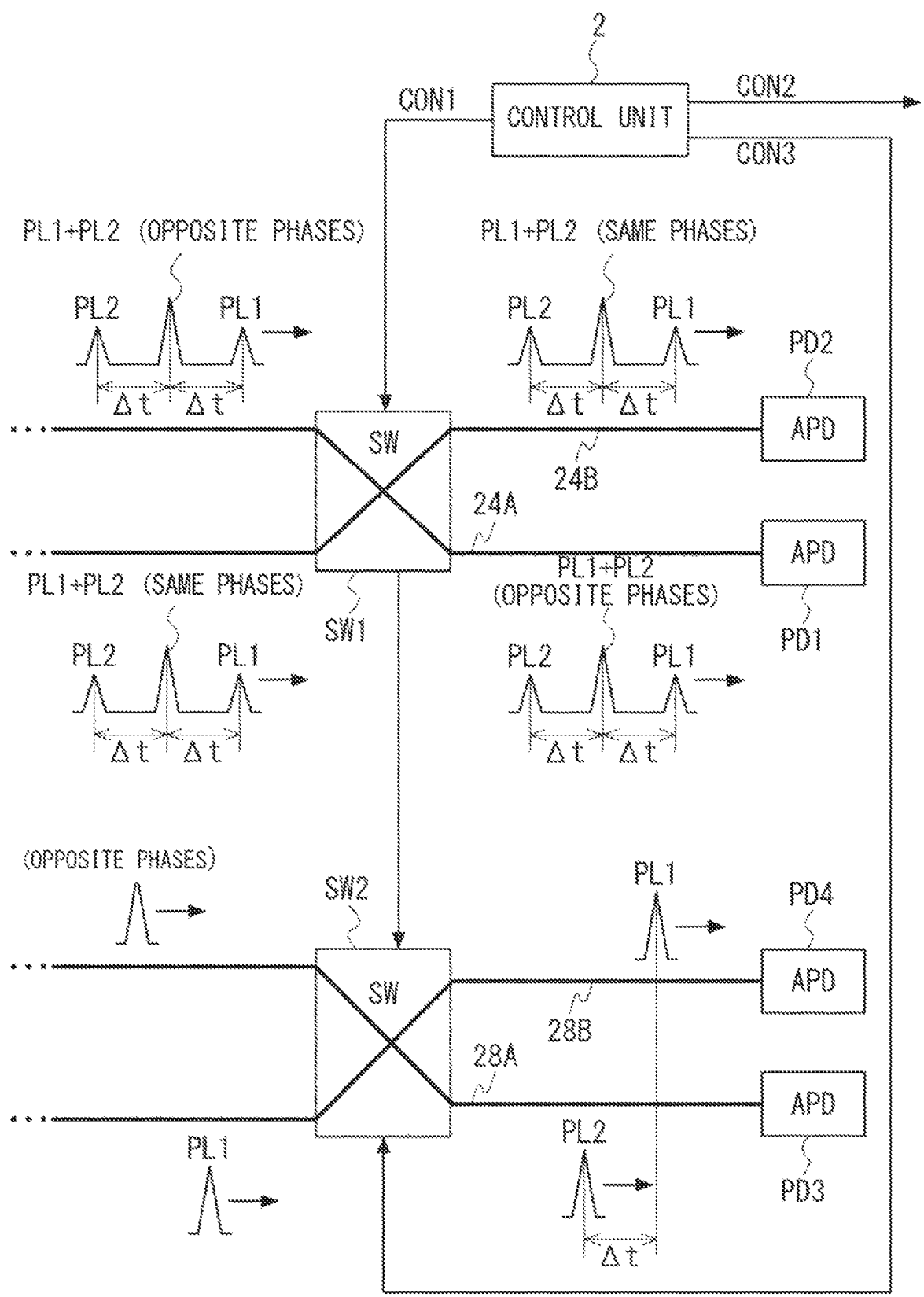
FIG. 12 is a diagram illustrating light pulse paths in a second mode in the modified example of the reception device according to the second example embodiment.

Next, the operations of the reception device 410 will be described. FIG. 11 illustrates a light pulse path in a first mode of the reception device 410, and FIG. 12 illustrates a light pulse path in a second mode of the reception device 410.

The photon detection according to the Z basis is realized by the control unit 2 giving a control signal CON3 to the optical switch SW2 to switch the connection between the input and the output and change the light pulse (photon) path, similarly to that in the reception device 400. In the first mode, by the optical switch SW2, a light pulse (photon) input from the optical waveguide 29 to the input IN3 in the first state (bit 0) is guided to the single-photon detector PD3 via the output OUT3, and a light pulse (photon) input from the optical waveguide 23 to the input IN4 in the second state (bit 1) is guided to the single-photon detector PD4 via the output OUT4. On the other hand, in the second mode, by the optical switch SW2, a light pulse (photon) input from the optical waveguide 29 to the input IN3 in the first state (bit 0) is guided to the single-photon detector PD4 via the output OUT4, and a light pulse (photon) input from the optical waveguide 23 to the input IN4 in the second state (bit 1) is guided to the single-photon detector PD3 via the output OUT3-IN3.

The photon detection according to the Y basis is realized by the control unit 2 giving a control signal CON1 to the optical switch SW1 to switch the connection between the input and the output and change the light pulse (photon) path, as in the reception device 400. The light pulse path at this time is similar to that in the reception device 400, and thus, the description thereof will be omitted.

Furthermore, the control of the signal processing unit 3 by the control unit 2 is also similar to that in the reception device 400, and thus, the description thereof will be omitted.

As described above, according to the present configuration as well, by randomly switching between the operation in the first mode and the operation in the second mode through the control unit 2 so that the operation in the first mode and the operation in the second mode are performed in a ratio of 1:1 or in a ratio of about 1:1, it is possible to average degrees of dependence of photon detection sensitivity on incident timing in the respective single-photon detectors. By averaging degrees of dependence of photon detection sensitivity on incident timing in the respective single-photon detectors, it is also possible to prevent eavesdropping using a time shift attack.

Third Example Embodiment

Figure 13:
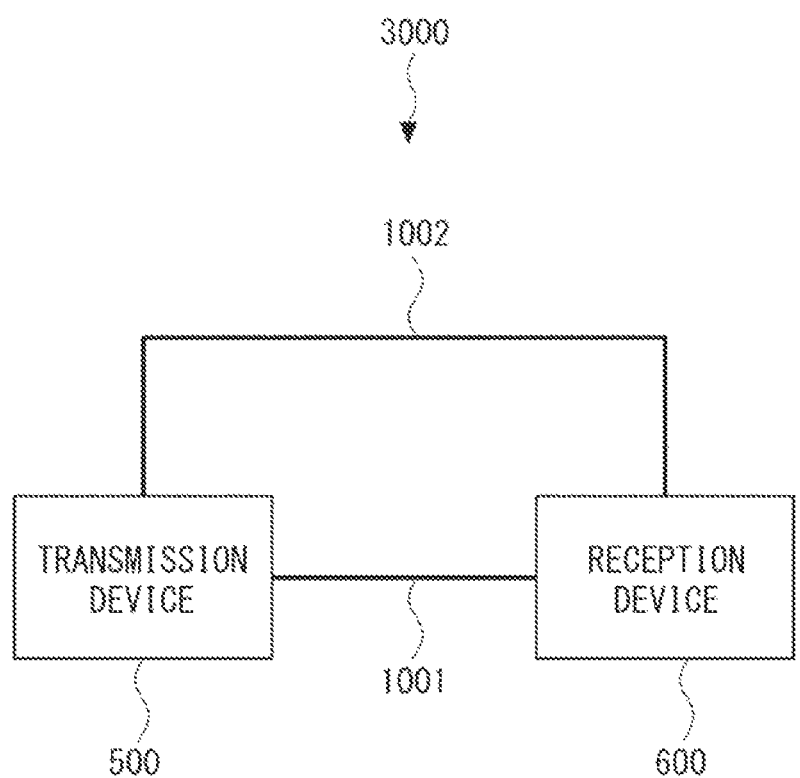
FIG. 13 is a diagram schematically illustrating a configuration of a quantum key distribution system according to a third example embodiment.

In the above-described example embodiments, the configuration to which the BB84 protocol in the phase encoding type is applied has been described, but in the present example embodiment, a configuration to which a BB84 protocol in a polarization encoding type is applied will be described. FIG. 13 schematically illustrates a configuration of a quantum key distribution system 3000 according to a third example embodiment. The quantum key distribution system 3000 includes a transmission device 500 and a reception device 600.

Figure 14:
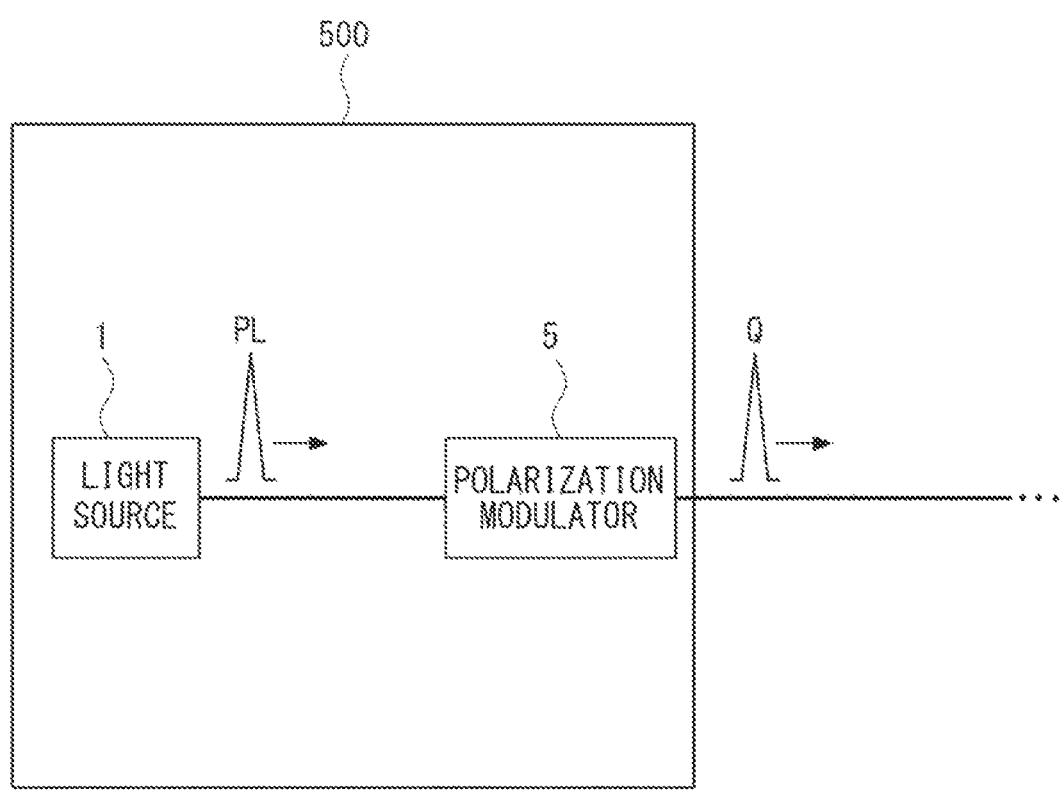
FIG. 14 is a diagram schematically illustrating a configuration of a transmission device according to the third example embodiment.

FIG. 14 schematically illustrates a configuration of the transmission device 500 according to the third example embodiment. The transmission device 500 includes a light source 1 and a polarization modulator 5. The light source 1 is similar to those in the above-described example embodiments, the description thereof will be omitted.

Whenever a light pulse PL is input, the polarization modulator 5 randomly selects one of the two encoding bases and polarization-modulates the light pulse PL using the selected encoding basis. FIG. 15 illustrates corresponding relationships between encoding bases and bits. In the first encoding basis (e.g., straight basis), when the light pulse PL is H-polarized, the corresponding bit is "0", and when the light pulse PL is V-polarized, the corresponding bit is "1". In the second encoding basis (e.g., oblique basis), when the polarization plane of the light pulse PL is formed at 45°, the corresponding bit is "0", and when the polarization plane of the light pulse PL is formed at 135°, the corresponding bit is "1". Hereinafter, the states where polarization planes are formed at 0°, 90°, 45°, and 135° will be referred to as first to fourth polarization states, respectively.

When the first encoding basis (e.g., straight basis) is selected, the polarization modulator 5 modulates the light pulse PL to be H-polarized or V-polarized to encode the light pulse PL. When the second encoding basis (e.g., oblique basis) is selected, the polarization modulator 5 polarization-modulates the light pulse PL so that the polarization plane of the light pulse PL is formed at 45° or 135° to encode the light pulse PL. The polarization-modulated light pulse PL is transmitted as a quantum signal Q to the reception device 600 via the transmission path 1001.

Figure 16:
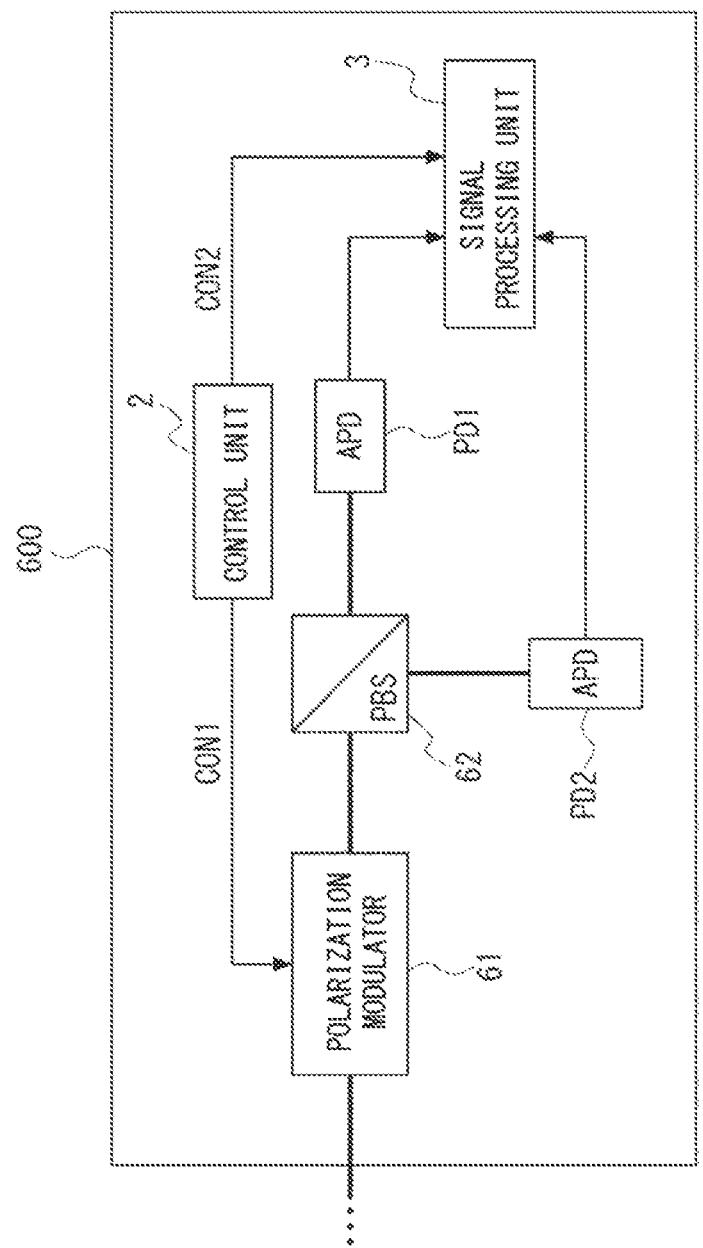
FIG. 16 is a diagram schematically illustrating a configuration of a reception device according to the third example embodiment.

FIG. 16 schematically illustrates a configuration of the reception device 600 according to the third example embodiment. The reception device 600 includes a polarization modulator 61, a polarization beam splitter 62, single-photon detectors PD1 and PD2, a control unit 2, and a signal processing unit 3. In the present configuration, the polarization modulator 61 and the polarization beam splitter 62 constitute a decoding unit that decodes a quantum signal.

Whenever a light pulse PL is input, the polarization modulator 61 randomly modulates the light pulse PL to rotate the polarization plane of the light pulse PL. The rotated angle of the polarization plane will be described below.

The polarization beam splitter 62 selectively passes an H-polarized light pulse toward the single-photon detector PD1 and selectively reflects a V-polarized light pulse toward the single-photon detector PD2.

The single-photon detector PD1 detects the H-polarized light pulse (photon), and the single-photon detector PD2 detects the V-polarized light pulse (photon).

The control unit 2 controls the operation of the polarization modulator 61 using a control signal CON1, and controls the operations of the single-photon detectors PD1 and PD2 using a control signal CON2.

Next, the operations of the reception device 600 will be described. The control unit 2 controls the polarization modulator 61 so that the rotated angle of the polarization plane when the polarization modulation is performed is 0° or −45° (first mode) or 90° or 45° (second mode). Furthermore, in the first mode, the control unit 2 controls the signal processing unit 3 so that the light pulse (photon) detected by the single-photon detector PD1 corresponds to H-polarization or polarization with a polarization plane of 45°, and the light pulse (photon) detected by the single-photon detector PD2 corresponds to V polarization or polarization with a polarization plane of 135°. In the second mode, the control unit 2 controls the signal processing unit 3 so that the light pulse (photon) detected by the single-photon detector PD1 corresponds to V-polarization or polarization with a polarization plane of 135°, and the light pulse (photon) detected by the single-photon detector PD2 corresponds to H-polarization or polarization with a polarization plane of 45°.

The detection of the light pulse (photon) in the first mode will be specifically described. In a case where the straight basis is selected in the transmission device 500 and the rotated angle of the polarization plane in the polarization modulator 61 is 0°, when an H-polarized light pulse is input, the H-polarized light pulse (photon) is directly incident into the single-photon detector PD1, and the light pulse detected by the single-photon detector PD1 is processed as the H-polarized light pulse. In addition, when a V-polarized light pulse is input, the V-polarized light pulse (photon) is directly incident into the single-photon detector PD2, and the light pulse detected by the single-photon detector PD2 is processed as the V-polarized light pulse. On the other hand, when the rotated angle of the polarization plane in the polarization modulator 61 is −45°, an obliquely polarized (−45° (in other words, 135°) or 45°) light pulse is incident into the polarization beam splitter 62. As a result, the polarization beam splitter 62 cannot perform appropriate polarization separation, and the single-photon detectors PD1 and PD2 cannot appropriately detect light pulses (photons).

When the oblique basis is selected in the transmission device 500 and the rotated angle of the polarization plane in the polarization modulator 61 is 0°, an obliquely polarized (45° or 135°) light pulse is directly incident into the polarization beam splitter 62. As a result, the polarization beam splitter 62 cannot perform appropriate polarization separation, and the single-photon detectors PD1 and PD2 cannot appropriately detect light pulses (photons). On the other hand, in a case where the rotated angle of the polarization plane in the polarization modulator 61 is −45°, when a light pulse having a polarization plane of 45° is input, its polarization plane is rotated by −45°, and for example, the light pulse is incident into the single-photon detector PD1 as an H-polarized light pulse (photon), and the light pulse detected by the single-photon detector PD1 is processed as a light pulse having a polarization plane of 45°. In addition, when a light pulse having a polarization plane of 135° is input, its polarization plane is rotated by −45°, and for example, the light pulse is incident into the single-photon detector PD2 as a V-polarized light pulse (photon), and the light pulse detected by the single-photon detector PD2 is processed as a light pulse having a polarization plane of 135°.

Next, the detection of the light pulse (photon) in the second mode will be specifically described. In a case where the straight basis is selected in the transmission device and the rotated angle of the polarization plane in the polarization modulator 61 is 90°, when an H-polarized light pulse is incident into the polarization modulator 61, its polarization plane is rotated by 90°, the light pulse is incident into the single-photon detector PD2 as a V-polarized light pulse (photon), and the light pulse detected by the single-photon detector PD2 is processed as an H-polarized light pulse. In addition, when a V-polarized light pulse is incident into the polarization modulator 61, its polarization plane is rotated by 90°, the light pulse is incident into the single-photon detector PD1 as an H-polarized light pulse (photon), and the light pulse detected by the single-photon detector PD1 is processed as a V-polarized light pulse. On the other hand, in a case where the rotated angle of the polarization plane in the polarization modulator 61 is 45°, an obliquely polarized (45° or 135°) light pulse is incident into the polarization beam splitter 62. As a result, the polarization beam splitter 62 cannot perform appropriate polarization separation, and the single-photon detectors PD1 and PD2 cannot appropriately detect light pulses (photons).

When the oblique basis is selected in the transmission device and the rotated angle of the polarization plane in the polarization modulator 61 is 90°, an obliquely polarized (45° or 135°) light pulse is incident into the polarization beam splitter 62. As a result, the polarization beam splitter 62 cannot perform appropriate polarization separation, and the single-photon detectors PD1 and PD2 cannot appropriately detect light pulses (photons). On the other hand, in a case where the rotated angle of the polarization plane in the polarization modulator 61 is 45°, when a light pulse having a polarization plane of 45° is input, its polarization plane is rotated by 45°, and for example, the light pulse is incident into the single-photon detector PD2 as a V-polarized light pulse (photon), and the light pulse detected by the single-photon detector PD2 is processed as a light pulse having a polarization plane of 45°. In addition, when a light pulse having a polarization plane of 135° is input, its polarization plane is rotated by 45°, and for example, the light pulse is incident into the single-photon detector PD1 as an H-polarized light pulse (photon), and the light pulse detected by the single-photon detector PD1 is processed as a light pulse having a polarization plane of 135°.

FIG. 17 illustrates a relationship between a polarization plane of a light pulse and a single-photon detector that detects the light pulse. As illustrated in FIG. 16, polarization planes of light pulses detected by the single-photon detector PD1 and the single-photon detector PD2, that is, bits, are replaced in the first mode and the second mode. In addition, polarization planes of light pulses detected by the single-photon detector PD3 and the single-photon detector PD4, that is, bits, are replaced in the first mode and the second mode.

According to the present configuration, by randomly switching between the operation in the first mode and the operation in the second mode through the control unit 2 so that the operation in the first mode and the operation in the second mode are performed in a ratio of 1:1 or in a ratio of about 1:1, it is possible to average degrees of dependence of photon detection sensitivity on incident timing in the respective single-photon detectors as in the above-described example embodiments. By averaging degrees of dependence of photon detection sensitivity on incident timing in the respective single-photon detectors, it is also possible to prevent eavesdropping using a time shift attack as in the above-described example embodiments.

Figure 18:
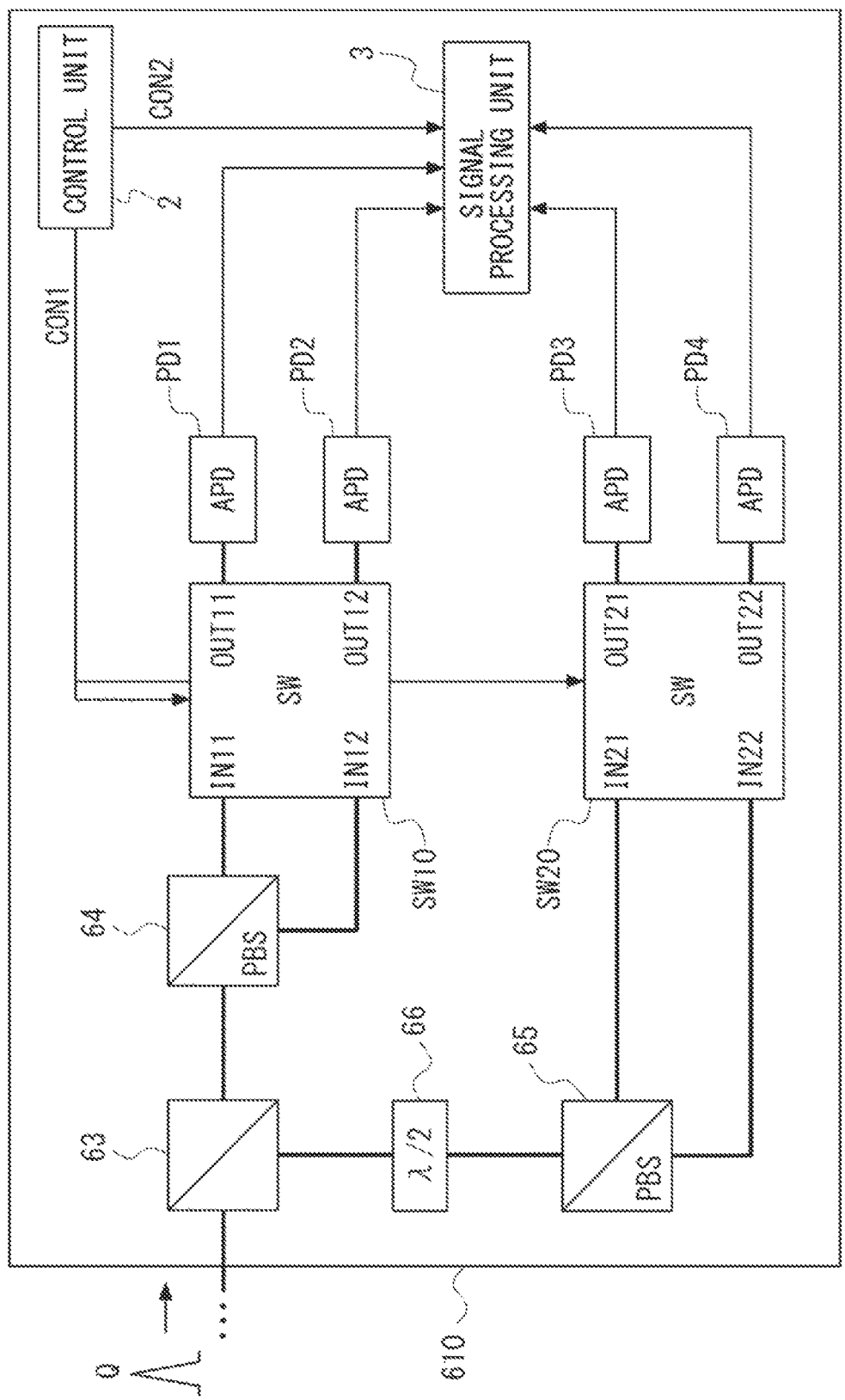
FIG. 18 is a diagram schematically illustrating a configuration of a first modified example of the reception device according to the third example embodiment.

Note that, similarly to the reception device 400 illustrated in FIG. 7, the reception device can be configured to include four single-photon detectors PD1 to PD4. FIG. 18 schematically illustrates a configuration of a reception device 610 that is a modified example of the reception device according to the third example embodiment.

The reception device 610 includes a demultiplexer 63, polarization beam splitters 64 and 65, a ½ wavelength plate 66, single-photon detectors PD1 to PD4, optical switches SW10 and SW20, a control unit 2, and a signal processing unit 3. In the present configuration, the demultiplexer 63, the polarization beam splitters 64 and 65, the ½ wavelength plate 66, and the optical switches SW10 and SW20, constitutes a decoding unit that decodes a quantum signal.

The demultiplexer 63 demultiplexes a quantum signal Q into the polarization beam splitter 64 (also referred to as a first polarization separation unit) and the ½ wavelength plate 66.

The polarization beam splitter 64 separates an H-polarized (0°) light pulse and a V-polarized (90°) light pulse of the quantum signal Q, and outputs them to the optical switch SW10.

The ½ wavelength plate 66 rotates the polarization plane of the quantum signal Q by −45°. As a result, for example, a light pulse having a polarization plane of 45° is converted into an H-polarized (0°) light pulse, and a light pulse having a polarization plane of 135° is converted into a V-polarized (90°) light pulse.

The polarization beam splitter 65 separates the H-polarized (0°) light pulse and the V-polarized (90°) light pulse incident from the ½ wavelength plate 66, and outputs them to the optical switch SW20.

In the present configuration, the ½ wavelength plate 66 and the polarization beam splitter 65 are also referred to as a second polarization separation unit.

The optical switch SW10 (also referred to as a third optical switch) has two inputs IN11 and IN12 (also referred to as fifth and sixth inputs) and two outputs OUT11 and OUT12 (also referred to as fifth and sixth outputs). The H-polarized (0°) light pulse is incident into the input IN11 from the polarization beam splitter 64, and the V-polarized (90°) light pulse is incident into the input IN12 from the polarization beam splitter 64. The output OUT11 is connected to the single-photon detector PD1, and the output OUT12 is connected to the single-photon detector PD2.

According to a control signal CON1 (also referred to as a first control signal) given from the control unit 2, the optical switch SW10 connects the input IN11 and the output OUT11 to each other and connects the input IN12 and the output OUT12 to each other in the first mode, and connects the input IN11 and the output OUT12 to each other and connects the input IN12 and the output OUT11 to each other in the second mode.

The optical switch SW20 (also referred to as a fourth optical switch) has two inputs IN21 and IN22 (also referred to as seventh and eighth inputs) and two outputs OUT21 and OUT22 (also referred to as seventh and eighth outputs). The H-polarized (0°) light pulse is incident into the input IN21 from the ½ wavelength plate 66, and the V-polarized (90°)

light pulse is incident into the input IN22 from the ½ wavelength plate 66. The output OUT21 is connected to the single-photon detector PD3, and the output OUT22 is connected to the single-photon detector PD4.

According to a control signal CON1 given from the control unit 2, the optical switch SW20 connects the input IN21 and the output OUT21 to each other and connects the input IN22 and the output OUT22 to each other in the first mode, and connects the input IN21 and the output OUT22 to each other and connects the input IN22 and the output OUT21 to each other in the second mode.

According to the present configuration, the single-photon detectors PD1 to PD4 can detect an H-polarized quantum signal Q (having a polarization plane of) 0°, a V-polarized quantum signal Q (having a polarization plane of 90°), a quantum signal Q having a polarization plane of 45°, and a quantum signal Q having a polarization plane of 135°, respectively. Hereinafter, the operations of the reception device 610 will be described.

The detection of the light pulse (photon) in the first mode will be specifically described. In the first mode, in the optical switch SW10, the input IN11 and the output OUT11 are connected to each other, and the input IN12 and the output OUT12 are connected to each other. In addition, in the optical switch SW20, the input IN21 and the output OUT21 are connected to each other, and the input IN22 and the output OUT22 are connected to each other.

When an H-polarized light pulse (photon) is input as a quantum signal Q, the H-polarized light pulse is incident into the single-photon detector PD1 via the polarization beam splitter 64 and the input IN11 and the output OUT11 of the optical switch SW10, and the light pulse detected by the single-photon detector PD1 is processed as an H-polarized light pulse.

When a V-polarized light pulse (photon) is input as a quantum signal Q, the V-polarized light pulse is incident into the single-photon detector PD2 via the polarization beam splitter 64 and the input IN12 and the output OUT12 of the optical switch SW10, and the light pulse detected by the single-photon detector PD2 is processed as a V-polarized light pulse.

When a light pulse (photon) having a polarization plane of 45° is input as a quantum signal Q, the light pulse having a polarization plane of 45° becomes an H-polarized light pulse by the ½ wavelength plate 66. The H-polarized light pulse is incident into the single-photon detector PD3 via the polarization beam splitter 65 and the input IN21 and the output OUT21 of the optical switch SW20, and the light pulse detected by the single-photon detector PD3 is processed as a light pulse having a polarization plane of 45°.

When a light pulse (photon) having a polarization plane of 135° is input as a quantum signal Q, the light pulse having a polarization plane of 135° becomes a V-polarized light pulse by the ½ wavelength plate 66. The V-polarized light pulse is incident into the single-photon detector PD4 via the polarization beam splitter 65 and the input IN22 and the output OUT22 of the optical switch SW20, and the light pulse detected by the single-photon detector PD4 is processed as a light pulse having a polarization plane of 135°.

Next, the detection of the light pulse (photon) in the second mode will be specifically described. In the second mode, in the optical switch SW10, the input IN11 and the output OUT12 are connected to each other, and the input IN12 and the output OUT11 are connected to each other. In addition, in the optical switch SW20, the input IN21 and the output OUT22 are connected to each other, and the input IN22 and the output OUT21 are connected to each other.

When an H-polarized light pulse is input as a quantum signal Q, the H-polarized light pulse is incident into the single-photon detector PD2 via the polarization beam splitter 64 and the input IN11 and the output OUT12 of the optical switch SW10, and the light pulse detected by the single-photon detector PD2 is processed as an H-polarized light pulse.

When a V-polarized light pulse is input as a quantum signal Q, the V-polarized light pulse is incident into the single-photon detector PD1 via the polarization beam splitter 64 and the input IN12 and the output OUT11 of the optical switch SW10, and the light pulse detected by the single-photon detector PD1 is processed as a V-polarized light pulse.

When a light pulse having a polarization plane of 45° is input as a quantum signal Q, the light pulse having a polarization plane of 45° becomes an H-polarized light pulse by the ½ wavelength plate 66. The H-polarized light pulse is incident into the single-photon detector PD4 via the polarization beam splitter 65 and the input IN21 and the output OUT22 of the optical switch SW20, and the light pulse detected by the single-photon detector PD4 is processed as a light pulse having a polarization plane of 45°.

When a light pulse having a polarization plane of 135° is input as a quantum signal Q, the light pulse having a polarization plane of 135° becomes a V-polarized light pulse by the ½ wavelength plate 66. The V-polarized light pulse is incident into the single-photon detector PD3 via the polarization beam splitter 65 and the input IN22 and the output OUT21 of the optical switch SW20, and the light pulse detected by the single-photon detector PD3 is processed as a light pulse having a polarization plane of 135°.

Therefore, according to the present configuration, as illustrated in FIG. 16, polarization planes of light pulses detected by the single-photon detector PD1 and the single-photon detector PD2, that is, bits, are replaced in the first mode and the second mode. In addition, polarization planes of light pulses detected by the single-photon detector PD3 and the single-photon detector PD4, that is, bits, can be replaced in the first mode and the second mode.

Therefore, according to the present configuration, by randomly switching between the operation in the first mode and the operation in the second mode through the control unit 2 so that the operation in the first mode and the operation in the second mode are performed in a ratio of 1:1 or in a ratio of about 1:1, it is possible to average degrees of dependence of photon detection sensitivity on incident timing in the respective single-photon detectors. By averaging degrees of dependence of photon detection sensitivity on incident timing in the respective single-photon detectors, it is also possible to prevent eavesdropping using a time shift attack.

Figure 19:
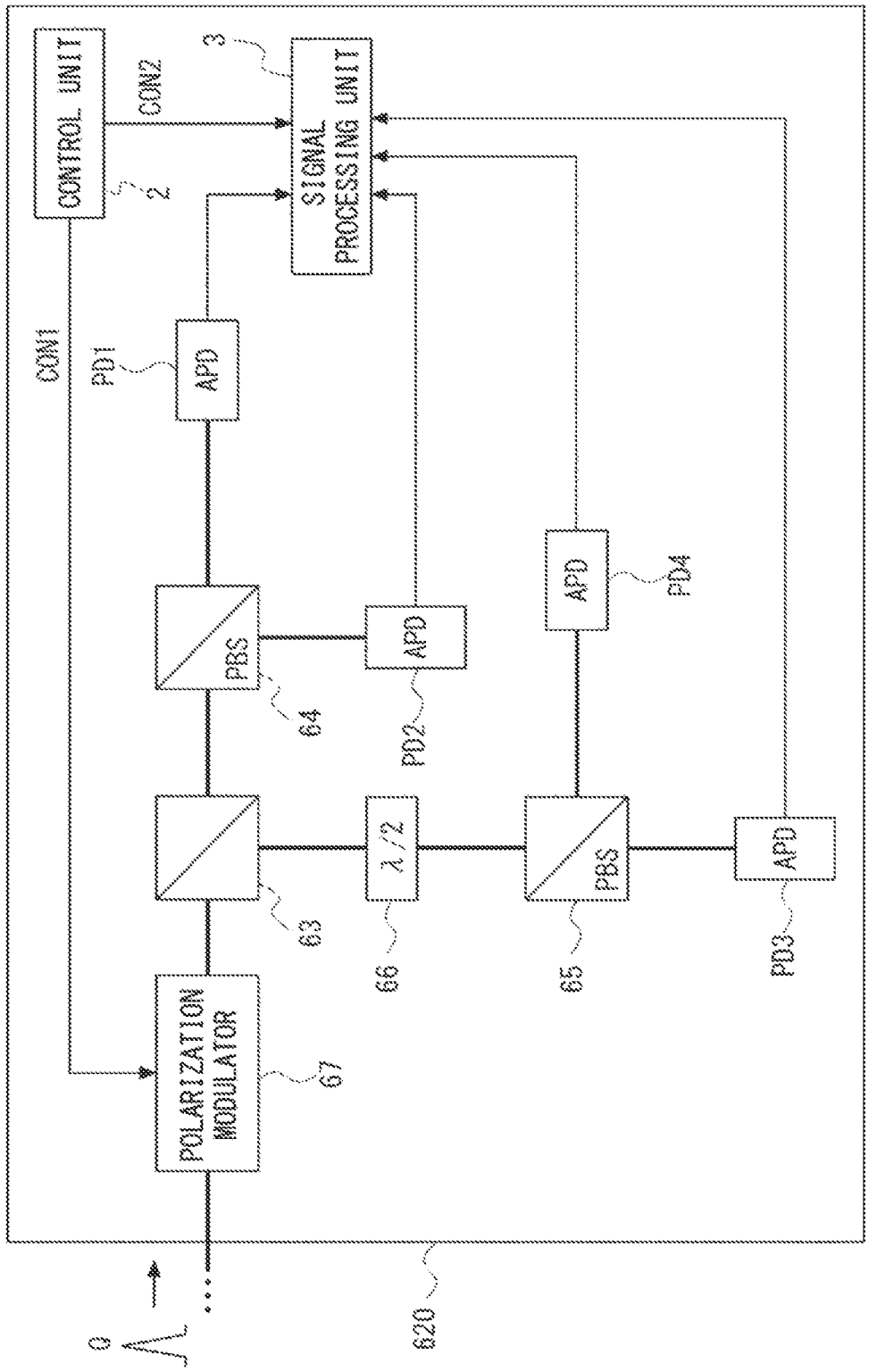
FIG. 19 is a diagram schematically illustrating a configuration of a second modified example of the reception device according to the third example embodiment.
Figure 20:
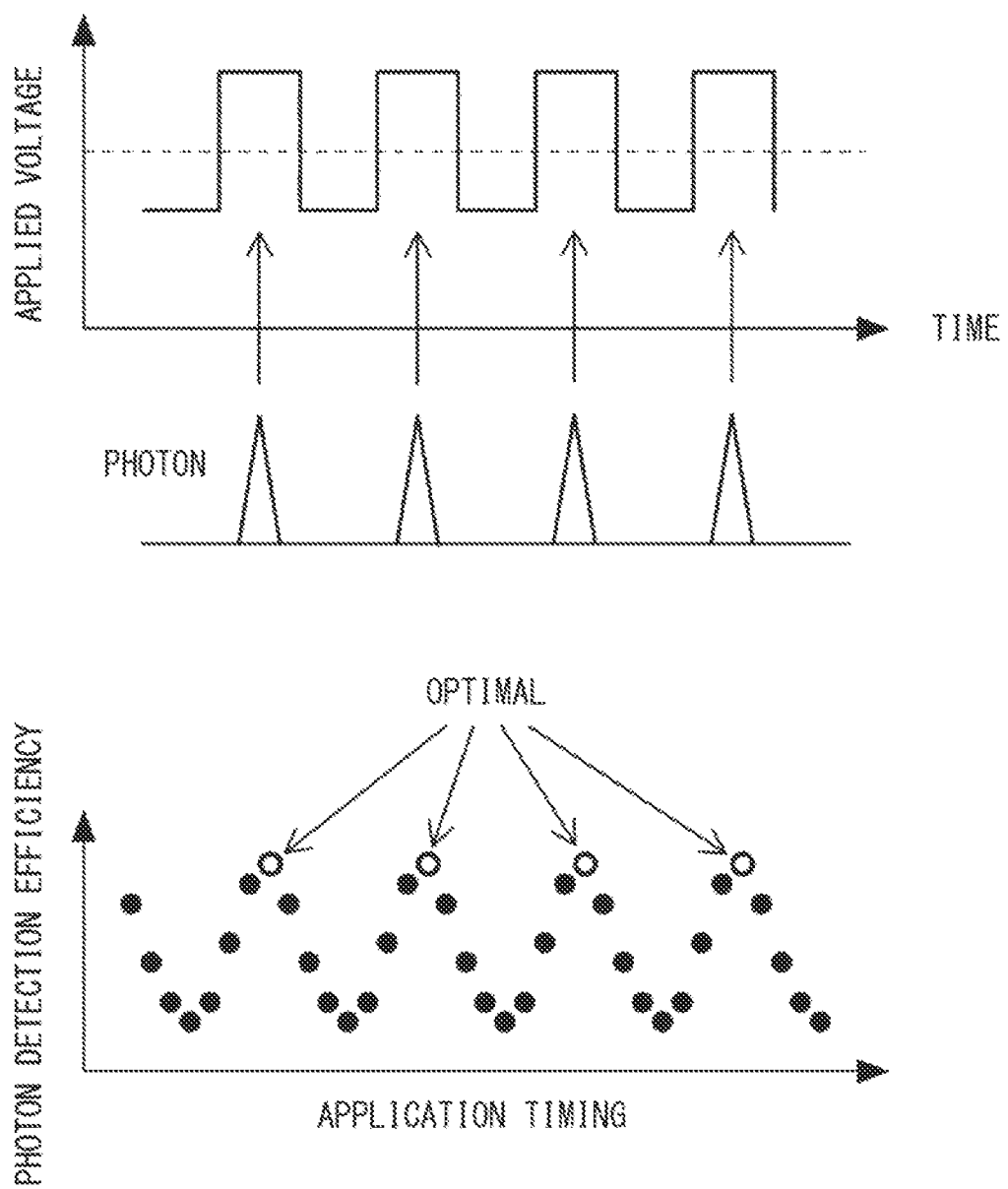
FIG. 20 is a diagram schematically illustrating a timing at which a voltage is applied to an APD and a degree of dependence of photon detection efficiency on time.
Figure 21:
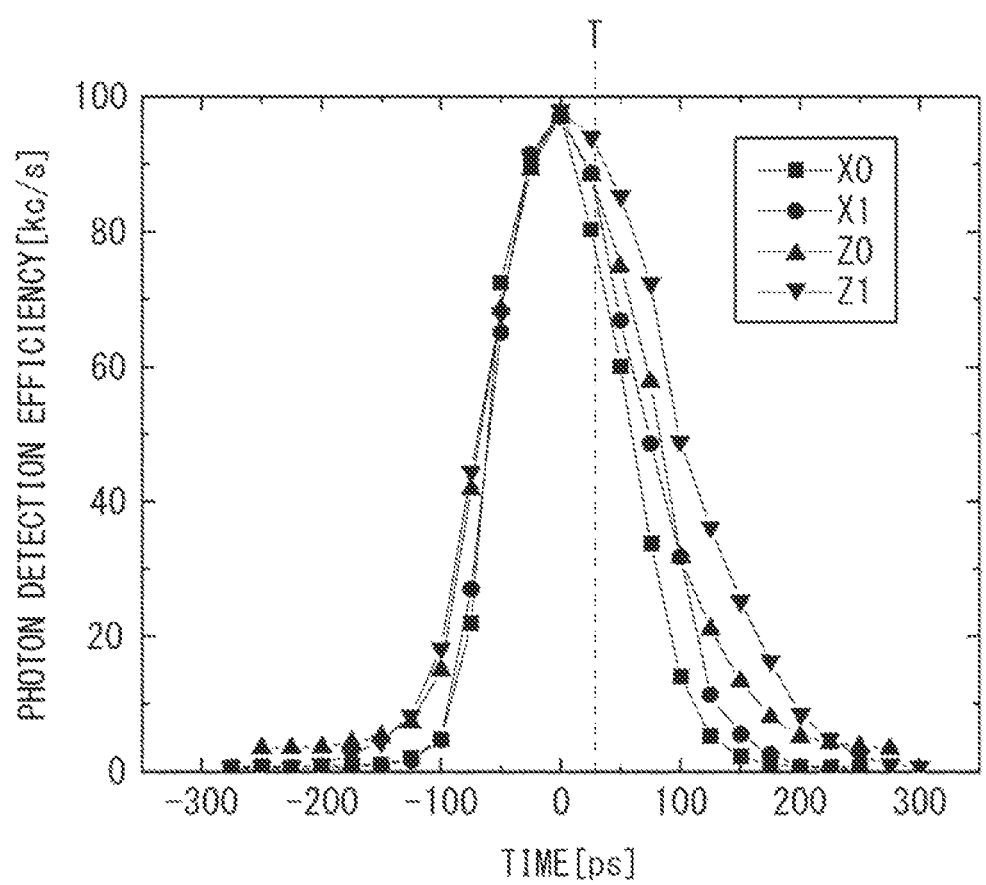
FIG. 21 is a diagram illustrating examples of degrees of dependence of photon detection efficiency on incident timing in a plurality of photon detectors.

Note that the averaging of degrees of dependence on incident timing in the reception device 610 can also be realized by another configuration. FIG. 19 schematically illustrates a configuration of a reception device 620 that is a modified example of the reception device 610.

The reception device 620 has a configuration in which the optical switches SW10 and SW20 of the reception device 610 are removed and a polarization modulator 67 is added. In the present configuration, the demultiplexer 63, the polarization beam splitters 64 and 65, the ½ wavelength plate 66, and the polarization modulator 67 constitute a decoding unit that decodes a quantum signal.

The polarization modulator 67 modulates the quantum signal Q to rotate its polarization plane according to a control signal CON1. The rotated angle in the first mode is 0° (that is, no modulation), and the rotated angle in the second mode is 90°.

The polarization beam splitter 64 selectively passes an H-polarized quantum signal Q toward the single-photon detector PD1 and selectively reflects a V-polarized quantum signal Q toward the single-photon detector PD2.

The polarization beam splitter 65 selectively passes an H-polarized light pulse toward the single-photon detector PD3 and selectively reflects a V-polarized light pulse toward the single-photon detector PD4.

The other configurations of the reception device 620 are similar to those of the reception device 610, and thus, the description thereof will be omitted. Hereinafter, the operations of the reception device 620 will be described.

The detection of the light pulse (photon) in the first mode will be specifically described. In the first mode, the rotated angle of the polarization plane by the polarization modulator 67 is 0°, an H-polarized light pulse, a V-polarized light pulse, a light pulse having a polarization plane of 45° and a light pulse having a polarization plane of 135° are directly incident into the demultiplexer 63.

When an H-polarized light pulse (photon) is input as a quantum signal Q, the H-polarized light pulse is incident into the single-photon detector PD1 via the polarization beam splitter 64, and the light pulse detected by the single-photon detector PD1 is processed as an H-polarized light pulse.

When a V-polarized light pulse (photon) is input as a quantum signal Q, the V-polarized light pulse is incident into the single-photon detector PD2 via the polarization beam splitter 64, and the light pulse detected by the single-photon detector PD2 is processed as a V-polarized light pulse.

When a light pulse (photon) having a polarization plane of 45° is input as a quantum signal Q, the light pulse having a polarization plane of 45° becomes an H-polarized light pulse by the ½ wavelength plate 66. The H-polarized light pulse is incident into the single-photon detector PD3 via the polarization beam splitter 65, and the light pulse detected by the single-photon detector PD3 is processed as a light pulse having a polarization plane of 45°.

When a light pulse (photon) having a polarization plane of 135° is input as a quantum signal Q, the light pulse having a polarization plane of 135° becomes a V-polarized light pulse by the ½ wavelength plate 66. The V-polarized light pulse is incident into the single-photon detector PD4 via the polarization beam splitter 65, and the light pulse detected by the single-photon detector PD4 is processed as a light pulse having a polarization plane of 135°.

Next, the detection of the light pulse (photon) in the second mode will be specifically described. In the second mode, the rotated angle of the polarization plane by the polarization modulator 67 is 90°.

When an H-polarized light pulse is input as a quantum signal Q, its polarization plane is rotated by 90° by the polarization modulator 67, and the light pulse become a V-polarized light pulse. The V-polarized light pulse is incident into the single-photon detector PD2 via the polarization beam splitter 64, and the light pulse detected by the single-photon detector PD2 is processed as an H-polarized light pulse.

When a V-polarized light pulse is input as a quantum signal Q, its polarization plane is rotated by 90° by the polarization modulator 67, and the light pulse become an H-polarized light pulse. The H-polarized light pulse is incident into the single-photon detector PD1 via the polarization beam splitter 64, and the light pulse detected by the single-photon detector PD1 is processed as a V-polarized light pulse.

When a light pulse having a polarization plane of 45° is input as a quantum signal Q, its polarization plane is rotated by 90° by the polarization modulator 67, and the light pulse becomes a light pulse having a polarization plane of 135°. The light pulse having a polarization plane of 135° becomes a V-polarized light pulse by the ½ wavelength plate 66. The V-polarized light pulse is incident into the single-photon detector PD4 via the polarization beam splitter 65, and the light pulse detected by the single-photon detector PD4 is processed as a light pulse having a polarization plane of 45°.

When a light pulse having a polarization plane of 135° is input as a quantum signal Q, its polarization plane is rotated by 90° by the polarization modulator 67, and the light pulse becomes a light pulse having a polarization plane of 45° (225°). The light pulse having a polarization plane of 45° becomes an H-polarized light pulse by the ½ wavelength plate 66. The H-polarized light pulse is incident into the single-photon detector PD3 via the polarization beam splitter 65, and the light pulse detected by the single-photon detector PD3 is processed as a light pulse having a polarization plane of 135°.

Therefore, according to the present configuration, polarization planes of light pulses detected by the single-photon detector PD1 and the single-photon detector PD2, that is, bits, are replaced in the first mode and the second mode, as in the reception device 610. In addition, polarization planes of light pulses detected by the single-photon detector PD3 and the single-photon detector PD4, that is, bits, can be replaced in the first mode and the second mode.

Therefore, according to the present configuration, by randomly switching between the operation in the first mode and the operation in the second mode through the control unit 2 so that the operation in the first mode and the operation in the second mode are performed in a ratio of 1:1 or in a ratio of about 1:1, it is possible to average degrees of dependence of photon detection sensitivity on incident timing in the respective single-photon detectors, as in the reception device 610. By averaging degrees of dependence of photon detection sensitivity on incident timing in the respective single-photon detectors, it is also possible to prevent eavesdropping using a time shift attack.

OTHER EXAMPLE EMBODIMENTS

Note that the present invention is not limited to the above-described example embodiments, and can be appropriately changed without departing from the gist. For example, it has been described in each of the above-described example embodiments that an avalanche photodiode is used as a single-photon detector, but a single-photon detector having another configuration may be applied as long as the single-photon detector has photon detection efficiency depending on a timing at which a photon is incident.

The configuration for implementing the BB84 protocol in the phase encoding type and the configuration for implementing the BB84 protocol in the polarization encoding type in the above-described example embodiments are merely examples, and it goes without saying that other configurations can be taken as appropriate as long as similar quantum key distribution can be implemented.

Some or all of the above-described example embodiments may be described as in the following supplementary notes, but are not limited to the following supplementary notes.

(Supplementary note 1) A reception device including: a decoding unit configured to decode a quantum signal incident thereinto; a plurality of detectors configured to detect photons of the decoded quantum signal output from the decoding unit; a signal processing unit configured to detect bits of the decoded quantum signal based on photon detection results of the plurality of detectors; and a control unit configured to perform switching processing by switching destinations to which two decoded quantum signals corresponding to one encoding basis are output between two of the detectors constituting a pair corresponding to the one encoding basis, and switching the bits detected by the signal processing unit based on the respective photon detection results of the two detectors constituting the pair.

(Supplementary note 2) The reception device according to Supplementary note 1, in which a phase of a light pulse included in the quantum signal incident into the reception device is shifted by 0 or π in a first encoding basis, and is shifted by π/2 or 3π/2 in a second encoding basis, the decoding unit is constituted by an interferometer configured to allow a quantum signal to be incident thereinto, the quantum signal including a first light pulse of which a phase has been modulated in advance and a second light pulse delayed from the first light pulse by a predetermined time, delay the first light pulse by the predetermined time and modulate a phase of the second light pulse, and cause the delayed first light pulse and the modulated second light pulse to interfere with each other in opposite phases or in the same phase, such that the decoded quantum signal is output, and in the switching processing, the control unit performs switching so that a phase shift of the second light pulse in the interferometer becomes 0 or π.

(Supplementary note 3) The reception device according to Supplementary note 2, in which the decoding unit is constituted by a Mach-Zehnder interferometer, the plurality of detectors include first and second detectors that are the two detectors constituting the pair, the Mach-Zehnder interferometer includes: a first path configured to delay the quantum signal propagating therethrough; a second path in which a phase modulator configured to phase-modulate the quantum signal propagating therethrough is installed; a demultiplexer configured to demultiplex the quantum signal into the first and second paths; and a multiplexer/demultiplexer configured to output the decoded quantum signal obtained by causing the quantum signals having passed through the first and second paths to interfere with each other in the opposite phases to the first detector, and output the decoded quantum signal obtained by causing the quantum signals having passed through the first and second paths to interfere with each other in the same phase to the second detector, and in the switching processing, the control unit performs switching so that the phase shift of the second light pulse in the phase modulator becomes 0 or it, and switches the bits detected by the signal processing unit based on the respective photon detection results of the first and second detectors.

(Supplementary note 4) The reception device according to Supplementary note 1, in which the quantum signal is encoded on the basis of first and second encoding bases, the decoding unit outputs first and second decoded signals corresponding to the first encoding basis and third and fourth decoded signals corresponding to the second encoding basis, the plurality of detectors include first and second detectors corresponding to the first encoding basis and third and fourth detectors corresponding to the second encoding basis, and in the switching processing, the control unit: switches destinations to which the first and second decoded signals are output between the first and second detectors, and switches the bits detected by the signal processing unit based on the respective photon detection results of the first and second detectors; and switches destinations to which the third and fourth decoded signals are output between the third and fourth detectors, and switches the bits detected by the signal processing unit based on the respective photon detection results of the third and fourth detectors.

(Supplementary note 5) The reception device according to Supplementary note 4, further including: a first optical switch configured to switch the respective destinations to which the first and second decoded signals are output between the first and second detectors according to a first control signal from the control unit, the first optical switch being inserted between the decoding unit and the first and second detectors; and a second optical switch configured to switch the respective destinations to which the third and fourth decoded signals are output between the third and fourth detectors according to a second control signal from the control unit, the second optical switch being inserted between the decoding unit and the third and fourth detectors, in which, in the switching processing, the control unit: in a first mode, controls the first and second optical switches so that the destinations to which the first to fourth decoded signals are output become the first to fourth detectors, respectively; in a second mode, controls the first optical switch so that the destination to which the first decoded signal is output becomes the second detector and the destination to which the second decoded signal is output becomes the first detector, and controls the second optical switch so that the destination to which the third decoded signal is output becomes the fourth detector and the destination to which the fourth decoded signal is output becomes the third detector; and when performing switching between the first mode and the second mode, replacing the bits detected by the signal processing unit based on the respective photon detection results of the first and second detectors, and replacing the bits detected by the signal processing unit based on the respective photon detection results of the third and fourth detectors.

(Supplementary note 6) The reception device according to Supplementary note 5, in which in the first optical switch, the first and second decoded signals are input to first and second inputs, respectively, and first and second outputs are connected to the first and second detectors, respectively, in the second optical switch, the third and fourth decoded signals are input to third and fourth inputs, respectively, and third and fourth outputs are connected to the third and fourth detectors, respectively, and in the switching processing, the control unit: in a first mode, controls the first optical switch so that the first and second inputs are connected to the first and second outputs, respectively, and controls the second optical switch so that the third and fourth inputs are connected to the third and fourth outputs, respectively; and in a second mode, controls the first optical switch so that the first input is connected to the second output, and the second input is connected to the first output, and controls the second optical switch so that the third input is connected to the fourth output, and the fourth input is connected to the third output.

(Supplementary note 7) The reception device according to Supplementary note 1, in which the plurality of detectors include first and second detectors that are the two detectors constituting the pair, a light pulse included in the quantum signal incident into the reception device is polarization-modulated to be in a first or second polarization state in a first encoding basis, and is polarization-modulated to be in a third or fourth polarization state in a second encoding basis, the decoding unit includes: a polarization modulator configured to polarization-modulate the light pulse of the quantum signal and output light pulses in the first and second polarization states; and a polarization separation unit configured to output the light pulse in the first polarization state to the first detector and output the light pulse in the second polarization state to the second detector, and in the switching processing, the control unit: in a first mode, controls the polarization modulator to randomly perform polarization modulation so that the light pulses in the third and fourth polarization states become the light pulses in the first and second polarization states, respectively; in a second mode, controls the polarization modulator to randomly perform polarization modulation so that the light pulses in the first and second polarization states become the light pulses in the second and first polarization states, respectively, and the light pulses in the third and fourth polarization states become the light pulses in the second and first polarization states, respectively; and when performing switching between the first mode and the second mode, replaces the bits detected by the signal processing unit based on the respective photon detection results of the first and second detectors.

(Supplementary note 8) The reception device according to Supplementary note 1, in which a light pulse included in the quantum signal incident into the reception device is polarization-modulated to be in a first or second polarization state in a first encoding basis, and is polarization-modulated to be in a third or fourth polarization state in a second encoding basis, the plurality of detectors include first and second detectors corresponding to the first encoding basis and third and fourth detectors corresponding to the second encoding basis, the decoding unit includes: a demultiplexer configured to demultiplex the quantum signal incident thereinto; a first polarization separation unit configured to polarization-separate one light pulse demultiplexed by the demultiplexer into first and second light pulses in the first and second polarization states; a second polarization separation unit configured to polarization-separate the other light pulse demultiplexed by the demultiplexer into third and fourth light pulses in the third and fourth polarization states; a third optical switch configured to switch the respective destinations to which the first and second light pulses are output between the first and second detectors according to a control from the control unit, the third optical switch being inserted between the first polarization separation unit and the first and second detectors; and a fourth optical switch configured to switch the respective destinations to which the third and fourth light pulses are output between the third and fourth detectors according to a control from the control unit, the fourth optical switch being inserted between the second polarization separation unit and the third and fourth detectors, and in the switching processing, the control unit switches the bits detected by the signal processing unit based on the respective photon detection results of the first and second detectors, and switches the bits detected by the signal processing unit based on the respective photon detection results of the third and fourth detectors.

(Supplementary note 9) The reception device according to Supplementary note 8, in which in the third optical switch, the first and second light pulses are input to fifth and sixth inputs, respectively, and fifth and sixth outputs are connected to the first and second detectors, respectively, in the fourth optical switch, the third and fourth light pulses are input to seventh and eighth inputs, respectively, and seventh and eighth outputs are connected to the third and fourth detectors, respectively, and in the switching processing, the control unit: in a first mode, controls the third optical switch so that the fifth and sixth inputs are connected to the fifth and sixth outputs, respectively, and controls the fourth optical switch so that the seventh and eighth inputs are connected to the seventh and eighth outputs, respectively; in a second mode, controls the third optical switch so that the fifth input is connected to the sixth output and the sixth input is connected to the fifth output, and controls the fourth optical switch so that the seventh input is connected to the eighth output and the eighth input is connected to the seventh output; and when performing switching between the first mode and the second mode, replaces the bits detected by the signal processing unit based on the respective photon detection results of the first and second detectors, and replaces the bits detected by the signal processing unit are replaced based on the respective photon detection results of the third and fourth detectors.

(Supplementary note 10) The reception device according to Supplementary note 1, in which a light pulse included in the quantum signal incident into the reception device is polarization-modulated to be in a first or second polarization state in a first encoding basis, and is polarization-modulated to be in a third or fourth polarization state in a second encoding basis, the plurality of detectors include first and second detectors corresponding to the first encoding basis and third and fourth detectors corresponding to the second encoding basis, the decoding unit includes: a polarization modulator configured to perform polarization modulation so that the first and second polarization states of the light pulse of the quantum signal become the second and first polarization states, respectively, and the third and fourth polarization states become the fourth and third polarization states, respectively; a demultiplexer configured to demultiplex the light pulse output from the polarization modulator; a first polarization separation unit configured to polarization-separate one light pulse demultiplexed by the demultiplexer into light pulses in the first and second polarization states, output the light pulse in the first polarization state to the first detector, and output the light pulse in the second polarization state to the second detector; and a second polarization separation unit configured to polarization-separates the other light pulse demultiplexed by the demultiplexer into light pulses in the third and fourth polarization states, output the light pulse in the third polarization state to the third detector, and output the light pulse in the fourth polarization state to the fourth detector, and in the switching processing, the control unit performs switching as to whether or not the polarization modulator performs polarization modulation, switches the bits detected by the signal processing unit based on the respective photon detection results of the first and second detectors, and switches the bits detected by the signal processing unit based on the respective photon detection results of the third and fourth detectors.

(Supplementary note 11) A quantum key distribution system including: a transmission device configured to output a quantum signal used for quantum key distribution; and a reception device configured to receive the quantum signal, in which the reception device includes: a decoding unit configured to decode the quantum signal incident thereinto; a plurality of detectors configured to detect photons of the decoded quantum signal output from the decoding unit; a signal processing unit configured to detect bits of the decoded quantum signal based on photon detection results of the plurality of detectors; and a control unit configured to perform switching processing by switching destinations to which two decoded quantum signals corresponding to one encoding basis are output between two of the detectors constituting a pair corresponding to the one encoding basis, and switching the bits detected by the signal processing unit based on the respective photon detection results of the two detectors constituting the pair.

(Supplementary note 12) A method for detecting a quantum signal, the method including: decoding an incident quantum signal; detecting photons of the decoded quantum signal by a plurality of detectors; detecting bits of the decoded quantum signal based on photon detection results of the plurality of detectors; and switching destinations to which two decoded quantum signals corresponding to one encoding basis are output between two of the detectors constituting a pair corresponding to the one encoding basis, and switching the bits detected based on the respective photon detection results of the two detectors constituting the pair.

Although the invention of the present application has been described above with reference to the example embodiments, the invention of the present application is not limited to the above. Various modifications that can be understood by those skilled in the art can be made to the configuration and details of the invention of the present application within the scope of the invention.

This application claims priority based on Japanese Patent Application No. 2021-13984 filed on Jan. 29, 2021, the disclosure of which is incorporated herein in its entirety.

REFERENCE SIGNS LIST

1 LIGHT SOURCE
2 CONTROL UNIT
3 SIGNAL PROCESSING UNIT
4A, 4B, 17, 27 PHASE MODULATOR
5 POLARIZATION MODULATOR
10, 20, 30, 40, 40A, 40B INTERFEROMETER
10A, 20A INPUT
10B OUTPUT
11 to 14, 11 to 13, 41, 42 OPTICAL WAVEGUIDE
15, 25, 43, 44 DEMULTIPLEXER
16 MULTIPLEXER
26 MULTIPLEXER/DEMULTIPLEXER
61 POLARIZATION MODULATOR
62 POLARIZATION BEAM SPLITTER
63 DEMULTIPLEXER
64, 65 POLARIZATION BEAM SPLITTER
66 ½ WAVELENGTH PLATE
67 POLARIZATION MODULATOR
100, 300, 500 TRANSMISSION DEVICE
200, 410, 600, 610, 620 RECEPTION DEVICE
1000 QUANTUM KEY DISTRIBUTION SYSTEM
1001 TRANSMISSION PATH
1002 TRANSMISSION PATH
2000 QUANTUM KEY DISTRIBUTION SYSTEM
3000 QUANTUM KEY DISTRIBUTION SYSTEM
PD1 to PD4 SINGLE-PHOTON DETECTOR
PL LIGHT PULSE
PL1 PRECEDING PULSE (LIGHT PULSE)
PL2 FOLLOWING PULSE (LIGHT PULSE)
Q QUANTUM SIGNAL
SW1, SW2, SW10, SW20 OPTICAL SWITCH

The invention claimed is:
1. A reception device comprising:
a decoding unit configured to decode a quantum signal incident thereinto;
a plurality of detectors configured to detect photons of the decoded quantum signal output from the decoding unit;
a signal processing unit configured to detect bits of the decoded quantum signal based on photon detection results of the plurality of detectors; and
a control unit configured to perform switching processing by switching destinations to which two decoded quantum signals corresponding to one encoding basis are output between two of the detectors constituting a pair corresponding to the one encoding basis, and switching the bits detected by the signal processing unit based on the respective photon detection results of the two detectors constituting the pair.

2. The reception device according to claim 1, wherein a phase of a light pulse included in the quantum signal incident into the reception device is shifted by 0 or $\pi$ in a first encoding basis, and is shifted by $\pi/2$ or $3\pi/2$ in a second encoding basis,
the decoding unit is constituted by an interferometer configured to allow a quantum signal to be incident thereinto, the quantum signal including a first light pulse of which a phase has been modulated in advance and a second light pulse delayed from the first light pulse by a predetermined time, delay the first light pulse by the predetermined time and modulate a phase of the second light pulse, and cause the delayed first light pulse and the modulated second light pulse to interfere with each other in opposite phases or in the same phase, such that the decoded quantum signal is output, and
in the switching processing, the control unit performs switching so that a phase shift of the second light pulse in the interferometer becomes 0 or $\pi$.

3. The reception device according to claim 2, wherein
the decoding unit is constituted by a Mach-Zehnder interferometer,
the plurality of detectors include first and second detectors that are the two detectors constituting the pair,
the Mach-Zehnder interferometer includes:
a first path configured to delay the quantum signal propagating therethrough;
a second path in which a phase modulator configured to phase-modulate the quantum signal propagating therethrough is installed;
a demultiplexer configured to demultiplex the quantum signal into the first and second paths; and
a multiplexer/demultiplexer configured to output the decoded quantum signal obtained by causing the quantum signals having passed through the first and second paths to interfere with each other in the opposite phases to the first detector, and output the decoded quantum signal obtained by causing the quantum signals having passed through the first and second paths to interfere with each other in the same phase to the second detector, and
in the switching processing, the control unit performs switching so that the phase shift of the second light pulse in the phase modulator becomes 0 or $\pi$, and switches the bits detected by the signal processing unit based on the respective photon detection results of the first and second detectors.

4. The reception device according to claim 1, wherein the quantum signal is encoded on the basis of first and second encoding bases, the decoding unit outputs first and second decoded signals corresponding to the first encoding basis and third and fourth decoded signals corresponding to the second encoding basis, the plurality of detectors include first and second detectors corresponding to the first encoding basis and third and fourth detectors corresponding to the second encoding basis, and in the switching processing, the control unit:

switches destinations to which the first and second decoded signals are output between the first and second detectors, and switches the bits detected by the signal processing unit based on the respective photon detection results of the first and second detectors; and switches destinations to which the third and fourth decoded signals are output between the third and fourth detectors, and switches the bits detected by the signal processing unit based on the respective photon detection results of the third and fourth detectors.

5. The reception device according to claim 4, further comprising:

a first optical switch configured to switch the respective destinations to which the first and second decoded signals are output between the first and second detectors according to a first control signal from the control unit, the first optical switch being inserted between the decoding unit and the first and second detectors; and a second optical switch configured to switch the respective destinations to which the third and fourth decoded signals are output between the third and fourth detectors according to a second control signal from the control unit, the second optical switch being inserted between the decoding unit and the third and fourth detectors, wherein, in the switching processing, the control unit:

in a first mode, controls the first and second optical switches so that the destinations to which the first to fourth decoded signals are output become the first to fourth detectors, respectively;

in a second mode, controls the first optical switch so that the destination to which the first decoded signal is output becomes the second detector and the destination to which the second decoded signal is output becomes the first detector, and controls the second optical switch so that the destination to which the third decoded signal is output becomes the fourth detector and the destination to which the fourth decoded signal is output becomes the third detector; and when performing switching between the first mode and the second mode, replacing the bits detected by the signal processing unit based on the respective photon detection results of the first and second detectors, and replacing the bits detected by the signal processing unit based on the respective photon detection results of the third and fourth detectors.

6. The reception device according to claim 5, wherein in the first optical switch, the first and second decoded signals are input to first and second inputs, respectively, and first and second outputs are connected to the first and second detectors, respectively, in the second optical switch, the third and fourth decoded signals are input to third and fourth inputs, respectively, and third and fourth outputs are connected to the third and fourth detectors, respectively, and in the switching processing, the control unit:

in a first mode, controls the first optical switch so that the first and second inputs are connected to the first and second outputs, respectively, and controls the second optical switch so that the third and fourth inputs are connected to the third and fourth outputs, respectively; and in a second mode, controls the first optical switch so that the first input is connected to the second output, and the second input is connected to the first output, and controls the second optical switch so that the third input is connected to the fourth output, and the fourth input is connected to the third output.

7. The reception device according to claim 1, wherein the plurality of detectors include first and second detectors that are the two detectors constituting the pair, a light pulse included in the quantum signal incident into the reception device is polarization-modulated to be in a first or second polarization state in a first encoding basis, and is polarization-modulated to be in a third or fourth polarization state in a second encoding basis, the decoding unit includes:

a polarization modulator configured to polarization-modulate the light pulse of the quantum signal and output light pulses in the first and second polarization states; and a polarization separation unit configured to output the light pulse in the first polarization state to the first detector and output the light pulse in the second polarization state to the second detector, and in the switching processing, the control unit:

in a first mode, controls the polarization modulator to randomly perform polarization modulation so that the light pulses in the third and fourth polarization states become the light pulses in the first and second polarization states, respectively;

in a second mode, controls the polarization modulator to randomly perform polarization modulation so that the light pulses in the first and second polarization states become the light pulses in the second and first polarization states, respectively, and the light pulses in the third and fourth polarization states become the light pulses in the second and first polarization states, respectively; and when performing switching between the first mode and the second mode, replaces the bits detected by the signal processing unit based on the respective photon detection results of the first and second detectors.

8. The reception device according to claim 1, wherein a light pulse included in the quantum signal incident into the reception device is polarization-modulated to be in a first or second polarization state in a first encoding basis, and is polarization-modulated to be in a third or fourth polarization state in a second encoding basis, the plurality of detectors include first and second detectors corresponding to the first encoding basis and third and fourth detectors corresponding to the second encoding basis, the decoding unit includes:

a demultiplexer configured to demultiplex the quantum signal incident thereinto;

a first polarization separation unit configured to polarization-separate one light pulse demultiplexed by the demultiplexer into first and second light pulses in the first and second polarization states;

a second polarization separation unit configured to polarization-separate the other light pulse demultiplexed by the demultiplexer into third and fourth light pulses in the third and fourth polarization states;

a third optical switch configured to switch the respective destinations to which the first and second light pulses are output between the first and second detectors according to a control from the control unit, the third optical switch being inserted between the first polarization separation unit and the first and second detectors; and a fourth optical switch configured to switch the respective destinations to which the third and fourth light pulses are output between the third and fourth detectors according to a control from the control unit, the fourth optical switch being inserted between the second polarization separation unit and the third and fourth detectors, and in the switching processing, the control unit switches the bits detected by the signal processing unit based on the respective photon detection results of the first and second detectors, and switches the bits detected by the signal processing unit based on the respective photon detection results of the third and fourth detectors.

9. The reception device according to claim 8, wherein in the third optical switch, the first and second light pulses are input to fifth and sixth inputs, respectively, and fifth and sixth outputs are connected to the first and second detectors, respectively, in the fourth optical switch, the third and fourth light pulses are input to seventh and eighth inputs, respectively, and seventh and eighth outputs are connected to the third and fourth detectors, respectively, and in the switching processing, the control unit:

in a first mode, controls the third optical switch so that the fifth and sixth inputs are connected to the fifth and sixth outputs, respectively, and controls the fourth optical switch so that the seventh and eighth inputs are connected to the seventh and eighth outputs, respectively;

in a second mode, controls the third optical switch so that the fifth input is connected to the sixth output and the sixth input is connected to the fifth output, and controls the fourth optical switch so that the seventh input is connected to the eighth output and the eighth input is connected to the seventh output; and when performing switching between the first mode and the second mode, replaces the bits detected by the signal processing unit based on the respective photon detection results of the first and second detectors, and replaces the bits detected by the signal processing unit are replaced based on the respective photon detection results of the third and fourth detectors.

10. The reception device according to claim 1, wherein a light pulse included in the quantum signal incident into the reception device is polarization-modulated to be in a first or second polarization state in a first encoding basis, and is polarization-modulated to be in a third or fourth polarization state in a second encoding basis, the plurality of detectors include first and second detectors corresponding to the first encoding basis and third and fourth detectors corresponding to the second encoding basis, the decoding unit includes:

a polarization modulator configured to perform polarization modulation so that the first and second polarization states of the light pulse of the quantum signal become the second and first polarization states, respectively, and the third and fourth polarization states become the fourth and third polarization states, respectively;

a demultiplexer configured to demultiplex the light pulse output from the polarization modulator;

a first polarization separation unit configured to polarization-separate one light pulse demultiplexed by the demultiplexer into light pulses in the first and second polarization states, output the light pulse in the first polarization state to the first detector, and output the light pulse in the second polarization state to the second detector; and a second polarization separation unit configured to polarization-separates the other light pulse demultiplexed by the demultiplexer into light pulses in the third and fourth polarization states, output the light pulse in the third polarization state to the third detector, and output the light pulse in the fourth polarization state to the fourth detector, and in the switching processing, the control unit performs switching as to whether or not the polarization modulator performs polarization modulation, switches the bits detected by the signal processing unit based on the respective photon detection results of the first and second detectors, and switches the bits detected by the signal processing unit based on the respective photon detection results of the third and fourth detectors.

11. A quantum key distribution system comprising:

a transmission device configured to output a quantum signal used for quantum key distribution; and a reception device configured to receive the quantum signal, wherein the reception device includes:

a decoding unit configured to decode the quantum signal incident thereinto;

a plurality of detectors configured to detect photons of the decoded quantum signal output from the decoding unit;

a signal processing unit configured to detect bits of the decoded quantum signal based on photon detection results of the plurality of detectors; and a control unit configured to perform switching processing by switching destinations to which two decoded quantum signals corresponding to one encoding basis are output between two of the detectors constituting a pair corresponding to the one encoding basis, and switching the bits detected by the signal processing unit based on the respective photon detection results of the two detectors constituting the pair.

12. A method for detecting a quantum signal, the method comprising:

decoding an incident quantum signal;

detecting photons of the decoded quantum signal by a plurality of detectors;

detecting bits of the decoded quantum signal based on photon detection results of the plurality of detectors; and switching destinations to which two decoded quantum signals corresponding to one encoding basis are output between two of the detectors constituting a pair corresponding to the one encoding basis, and switching the bits detected based on the respective photon detection results of the two detectors constituting the pair.

* * * * *